(12) United States Patent
Dyer et al.

(10) Patent No.: US 12,134,923 B2
(45) Date of Patent: Nov. 5, 2024

(54) MECHANICALLY DAMPED PULL THEN LIFT HOLD OPEN ROD MECHANISM

(71) Applicant: MarathonNorco Aerospace, Inc., Waco, TX (US)

(72) Inventors: Ben Dyer, Waco, TX (US); Neil Christian, Waco, TX (US)

(73) Assignee: MARATHONNORCO AEROSPACE, INC., Waco, TX (US)

( * ) Notice: Subject to any disclaimer, the term of this patent is extended or adjusted under 35 U.S.C. 154(b) by 0 days.

(21) Appl. No.: 16/050,709

(22) Filed: Jul. 31, 2018

(65) Prior Publication Data

US 2019/0032377 A1    Jan. 31, 2019

Related U.S. Application Data

(60) Provisional application No. 62/539,056, filed on Jul. 31, 2017.

(51) Int. Cl.
| | | |
|---|---|---|
| E05C 17/30 | (2006.01) | |
| B64D 29/06 | (2006.01) | |
| E05B 17/00 | (2006.01) | |
| F15B 15/26 | (2006.01) | |
| F16F 9/02 | (2006.01) | |
| B64C 1/14 | (2006.01) | |

(52) U.S. Cl.
CPC ............. *E05C 17/30* (2013.01); *B64D 29/06* (2013.01); *E05B 17/0041* (2013.01); *F15B 15/261* (2013.01); *F16F 9/0254* (2013.01); *B64C 1/14* (2013.01); *E05Y 2201/218* (2013.01); *E05Y 2201/264* (2013.01); *E05Y 2900/502* (2013.01)

(58) Field of Classification Search
CPC .. E05C 17/30; E05C 17/0041; E05B 17/0041; F15B 15/261; F15B 2015/267
See application file for complete search history.

(56) References Cited

U.S. PATENT DOCUMENTS

| | | | |
|---|---|---|---|
| 4,295,413 A * | 10/1981 | Kamimura | ............ F15B 15/261 92/24 |
| 5,366,313 A | 11/1994 | LaBarre | |
| 7,654,371 B1 | 2/2010 | Metz et al. | |
| 10,787,841 B2 * | 9/2020 | Dyer | ...................... B64D 29/08 |
| 11,498,690 B2 * | 11/2022 | Dyer | ................... E05B 47/0002 |
| 2010/0307872 A1 | 12/2010 | Wheeler et al. | |
| 2013/0206955 A1 * | 8/2013 | Palma | ..................... E05C 17/30 248/602 |
| 2015/0267724 A1 * | 9/2015 | Dyer | ..................... F15B 15/261 92/15 |

OTHER PUBLICATIONS

International Patent Application No. PCT/US2018/044575; Int'l Search Report and the Written Opinion; dated Oct. 3, 2018; 15 pages.
European Patent Application No. 18841995.6; Extended Search Report; dated Nov. 26, 2021; 17 pages.
International Preliminary Report on Patentability and Written Opinion issued in PCT/US2018/044575, dated Feb. 13, 2020.

* cited by examiner

*Primary Examiner* — Emily M Morgan
(74) *Attorney, Agent, or Firm* — BakerHostetler

(57) ABSTRACT

A hold open rod is configured to provide switched damping movement includes an inner tube assembly coupled to an outer tube assembly, the inner tube assembly movable within the outer tube assembly. The hold open rod also includes a damping mechanism configured to damp movement of the outer tube assembly with respect to the inner tube assembly.

19 Claims, 24 Drawing Sheets

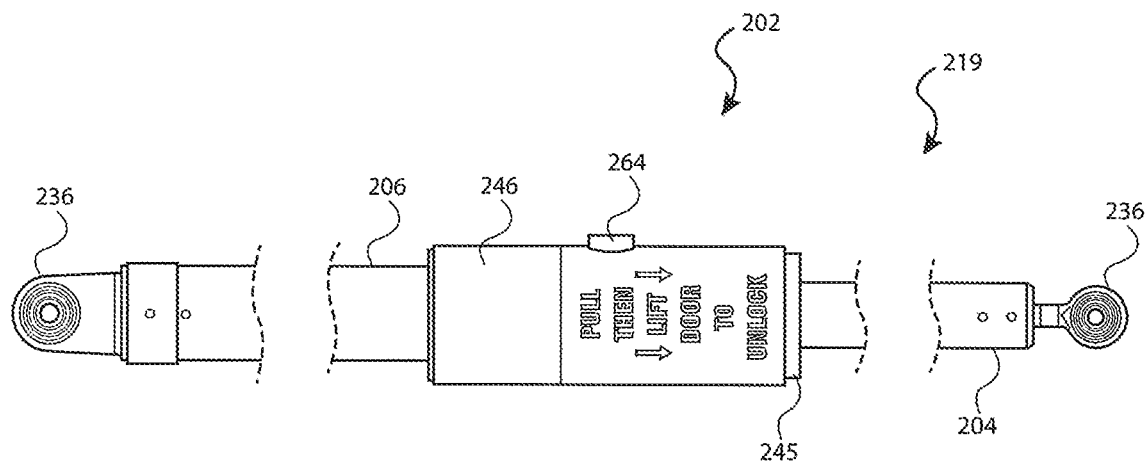
FIG. 4A
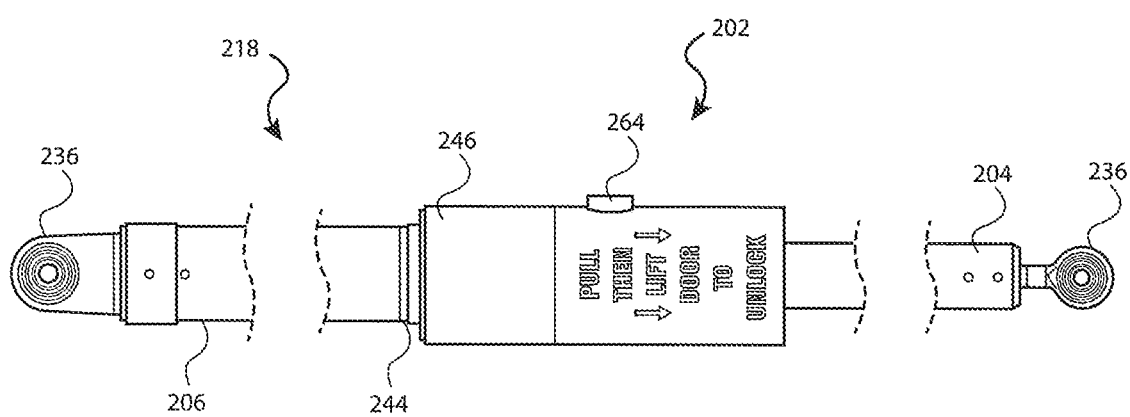
FIG. 4B
FIG. 4

MECHANICALLY DAMPED PULL THEN LIFT HOLD OPEN ROD MECHANISM

CROSS-REFERENCE TO RELATED APPLICATIONS

This application claims the benefit of U.S. Provisional Application No. 62/539,056 filed on Jul. 31, 2017, which is hereby incorporated by reference in its entirety for all purposes as if fully set forth herein.

FIELD OF THE DISCLOSURE

The disclosure relates to a mechanically damped pull then lift hold open rod mechanism. More particularly, the disclosure relates to a mechanically damped pull then lift hold open rod mechanism that selectively provides damping during particular operational positions and/or operational movements of the hold open rod mechanism.

BACKGROUND OF THE DISCLOSURE

Hold open rods are well known in both the automotive and aviation industries. Hold open rods may be used to hold a door or hatch open after the door or hatch has been opened manually or automatically. Generally, hold open rods may include two cylindrical, telescoping tubes with an inner tube located inside of an outer tube. Alternatively, hold open rods may include two tubes having a square cross-section, hexagonal cross-section, or the like. In one aspect, a stowed position may be where the inner tube is extended a fraction of the fully extended length from the outer tube. In one aspect, a stowed position may be where the inner tube is extended a large fraction of the fully extended length from the outer tube. In one aspect, a stowed position may be where the inner tube is located almost entirely within the outer tube. When in use, the inner tube may be extended to a designated position in order to hold open the door. In the extended position, the tubes may be locked in place in order to hold the door open. A lock mechanism may be used to prevent the inner tube from retracting into the outer tube.

A typical hold open rod supports a considerable amount of weight when locked in an open position. Once unlocked, the typical hold open rod provides negligible resistance to the movement of the component. This negligible resistance results in an unimpeded movement of the component. More specifically, once the hold open rod is unlocked, unless the component is held in another manner, the component will typically pivot very quickly with considerable momentum. This quick movement can injure maintenance personnel and damage the component, surrounding components, the hold open rod, and the like.

Accordingly, it is desirable to have a hold open rod with a mechanism that prevents quick unintended movement of the supported component.

SUMMARY OF THE DISCLOSURE

In one aspect, a hold open rod configured to provide switched damping movement includes an inner tube assembly coupled to an outer tube assembly, the inner tube assembly movable within the outer tube assembly. The hold open rod also includes a damping mechanism configured to damp movement of the outer tube assembly with respect to the inner tube assembly.

In one aspect, a hold open rod includes an inner tube assembly coupled to an outer tube assembly, the inner tube assembly movable within the outer tube assembly; an inner collar having a lock groove and unlock groove; an outer collar assembly coupled around the inner collar; a spring located within the outer collar assembly configured to engage the inner collar; a locking dog configured to engage the unlock groove when the hold open rod is in an unlocked configuration and the locking dog further configured to engage the lock groove when the hold open rod is in a locked configuration. The hold open rod also includes a damping mechanism configured to selectively damp movement of the outer tube assembly with respect to the inner tube assembly when the inner tube assembly is moving with respect to the outer tube assembly.

In one aspect, a hold open rod includes an inner tube assembly coupled to an outer tube assembly, the inner tube assembly movable within the outer tube assembly; an inner collar having a lock groove and unlock groove; an outer collar assembly coupled around the inner collar; a spring located within the outer collar assembly configured to engage the inner collar; a locking dog configured to engage the unlock groove when the hold open rod is in an unlocked configuration and the locking dog further configured to engage the lock groove when the hold open rod is in a locked configuration. The hold open rod also includes a damping mechanism configured to selectively damp movement of the outer tube assembly with respect to the inner tube assembly when the inner tube assembly is moving with respect to the outer tube assembly.

There has thus been outlined, rather broadly, certain aspects of the disclosure in order that the detailed description thereof herein may be better understood, and in order that the present contribution to the art may be better appreciated. There are, of course, additional aspects of the disclosure that will be described below and which will form the subject matter of the claims appended hereto.

In this respect, before explaining at least one aspect of the disclosure in detail, it is to be understood that the disclosure is not limited in its application to the details of construction and to the arrangements of the components set forth in the following description or illustrated in the drawings. The disclosure is capable of aspects in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods, and systems for carrying out the several purposes of the disclosure. It is important, therefore, that the claims be regarded as including such equivalent constructions insofar as they do not depart from the spirit and scope of the disclosure.

BRIEF DESCRIPTION OF THE DRAWINGS

FIG. 4 includes FIG. 4A and FIG. 4B and illustrates side views of the hold open rod of FIG. 3.

DETAILED DESCRIPTION

Figure 1:
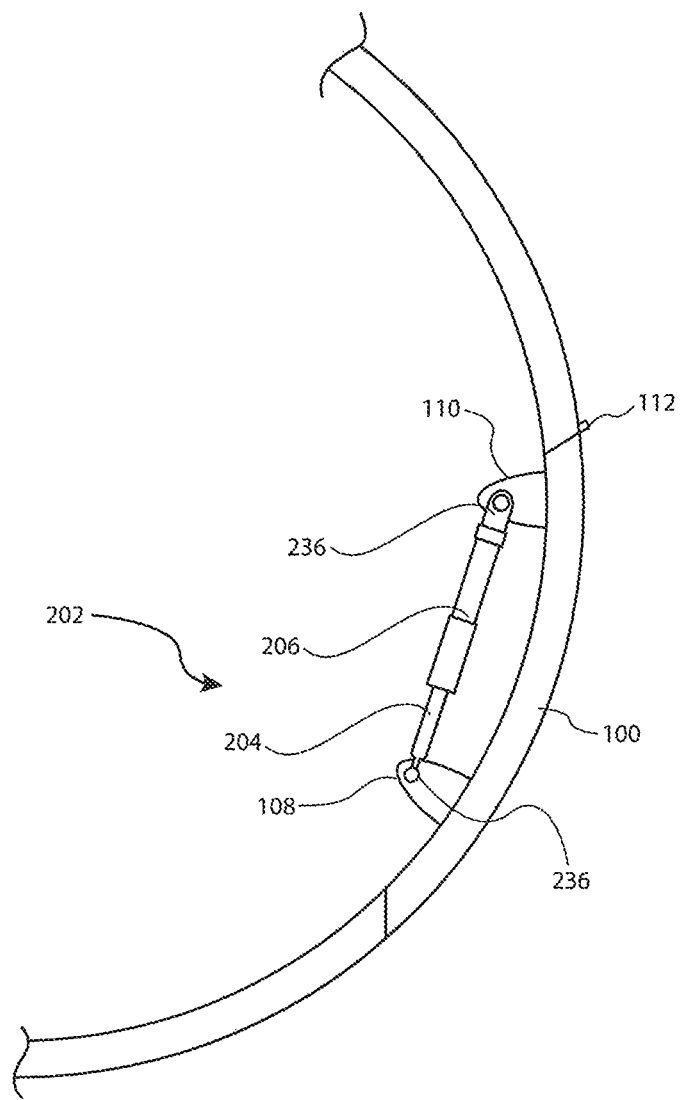
FIG. 1 illustrates a cross-sectional view illustrating a door in a closed configuration suitable for use with a hold open rod according to one aspect of the disclosure.

The disclosure will now be described with reference to the drawing figures, in which like reference numerals refer to like parts throughout. Various aspects of the disclosure advantageously provide a mechanically damped pull then lift hold open rod mechanism.

FIG. 1 illustrates a cross-sectional view illustrating a door in a closed configuration suitable for use with a hold open rod according to one aspect of the disclosure. In particular, FIG. 1 is a cross-sectional view illustrating a door 100, hatch, etc. in a closed configuration suitable for use with a hold open rod 202 according to an aspect of the disclosure. The door 100 may be located in a vehicle such as an aircraft, bus, ship, train, or the like. As illustrated in FIG. 1, the door 100 may be located in a fuselage of an aircraft. In other aspects, the door 100 may be an access panel, radome door, cover, cowling, etc. for an engine nacelle, luggage compartment, or other compartment in an aircraft, vehicle, etc. In addition, the hold open rod 202 may be used in other structures such as buildings. However, due to the advantageous reduction in weight and ease of maintenance, the hold open rod 202 may be particularly useful in aircraft and other types of vehicles. The hold open rod 202 may be made from various metallic materials such as aluminum, steel, titanium, and the like. Moreover, the hold open rod 202 may be formed of nonmetallic materials such as Kevlar, carbon fiber, fiberglass, various resins, a polyamide material, including aliphatic polyamides, polypthalamides, aromatic polyamides, carbon fiberglass, another type of thermoplastic compound, and the like. Implementation using nonmetallic materials may be preferable in some areas such as a radome to avoid interference with transmission and reception.

The hold open rod 202 may include an inner tube 204 and an outer tube 206. The inner tube 204 and outer tube 206 may be in axial alignment and slidable relative to one another in a telescoping manner. The hold open rod 202 may be attached to the door 100 with a rod end 236 that pivotally connects to a door fitting 108. The hold open rod 202 may be attached to the fuselage or the like by a bracket 110 that is connected to a rod end 236 of the outer tube 206. A converse attachment orientation is also contemplated by the disclosure.

Figure 2:
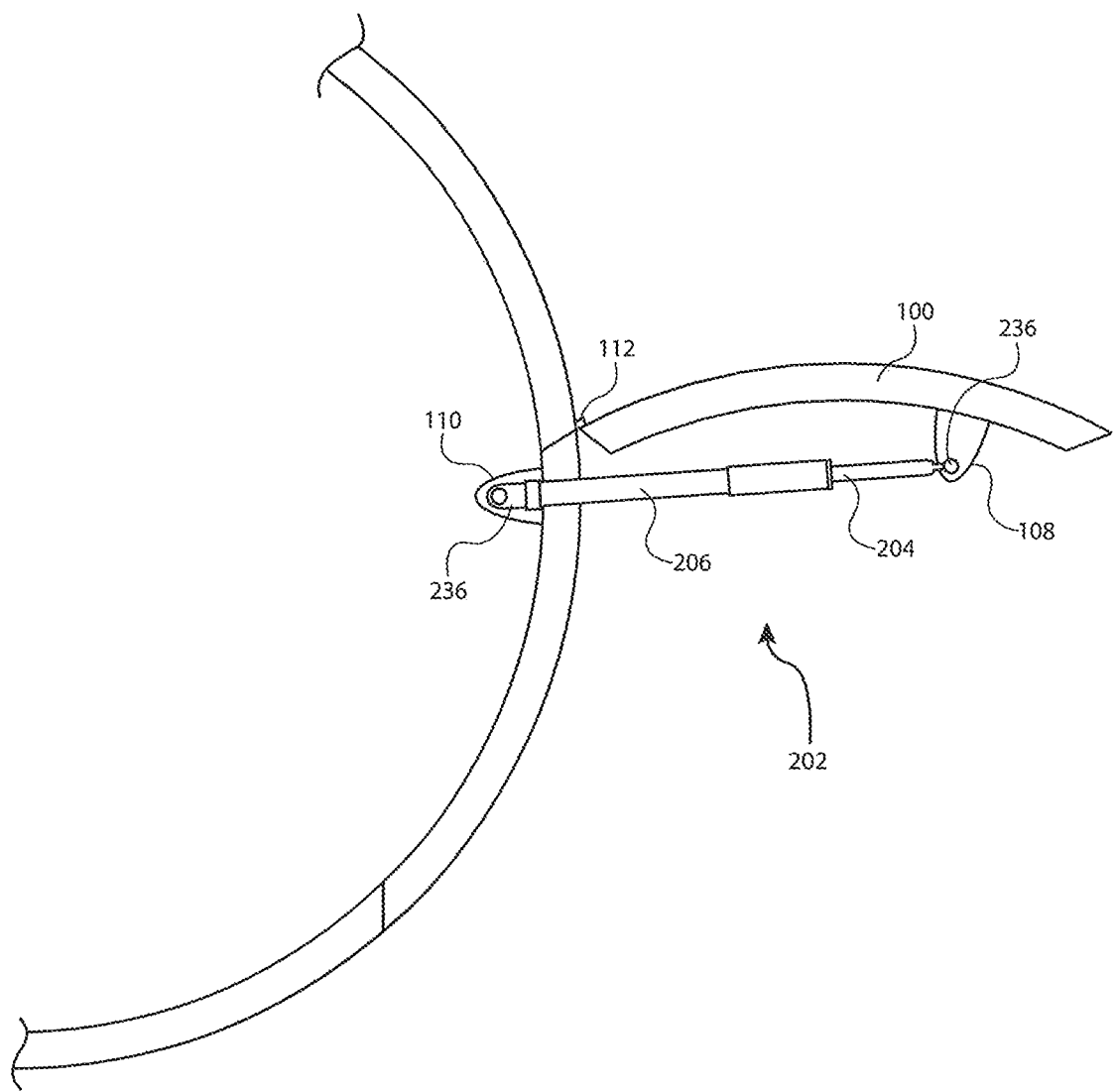
FIG. 2 illustrates a cross-sectional view illustrating a door in an open configuration suitable for use with a hold open rod according to one aspect of the disclosure.

FIG. 2 illustrates a cross-sectional view illustrating a door in an open configuration suitable for use with a hold open rod according to one aspect of the disclosure. As shown in FIG. 2, the door 100 may swing open and upwards via a hinge 112. In response to the door 100 being opened, the inner tube 204 may telescope out from the outer tube 206. In the aspect illustrated in FIG. 2, the door 100 is configured to close at least by gravity acting on the door 100. The hold open rod 202 maintains the door 100 in an open position with a lock providing resistance on the inner tube 204 to prevent the inner tube 204 from sliding into the outer tube 206. Additionally, the hold open rod 202 includes a damping mechanism that provides damping during particular operational positions and/or operational movements of the hold open rod 202. In one aspect, the dampening mechanism selectively applies damping while the door 100 is opening and/or closing. In many cases, the hold open rod 202 changes direction during a kinematic motion of the door 100. The damping mechanism is configured to operate selectively during this kinematic motion of the door 100.

In one aspect, as illustrated in FIG. 1 and FIG. 2, the door 100 may be configured to move from a closed lower position shown in FIG. 1 to an open upper position shown in FIG. 2.

In one aspect, the hold open rod 202 may be arranged in a stowed position and as the door 100 opens, the hold open rod 202 retracts, and the damping mechanism may be inactive.

In one aspect, the hold open rod 202 and damping mechanism may be configured such that as the door 100 opens, while the hold open rod 202 reaches a minimum length, the damping mechanism may be inactive.

In one aspect, the hold open rod 202 and damping mechanism may be configured such that as the door opens, the hold open rod 202 extends, and the damping mechanism may be inactive.

In one aspect, the hold open rod 202 and damping mechanism may be configured such that as the door opens, the hold open rod 202 locks in an extended length configuration. Thereafter, when an unlock sequence begins, the damping mechanism may be activated.

In one aspect, the hold open rod 202 and damping mechanism may be configured such that as the door closes, the hold open rod 202 retracts, and the damping mechanism may be active.

In one aspect, the hold open rod 202 and damping mechanism may be configured such that as the door closes, the hold open rod 202 reaches a minimum length, and the damping mechanism may be active.

In one aspect, the hold open rod 202 and damping mechanism may be configured such that as the door closes, the hold open rod 202 extends, and the damping mechanism is active.

In one aspect, the hold open rod 202 and damping mechanism may be configured such that as the door closes, the hold open rod 202 reaches a stowed length, and the damping mechanism may be deactivated.

In one aspect, the damping mechanism slows the movement of the door 100 towards the closed position illustrated in FIG. 1 when the hold open rod 202 is unlocked.

Figure 24:
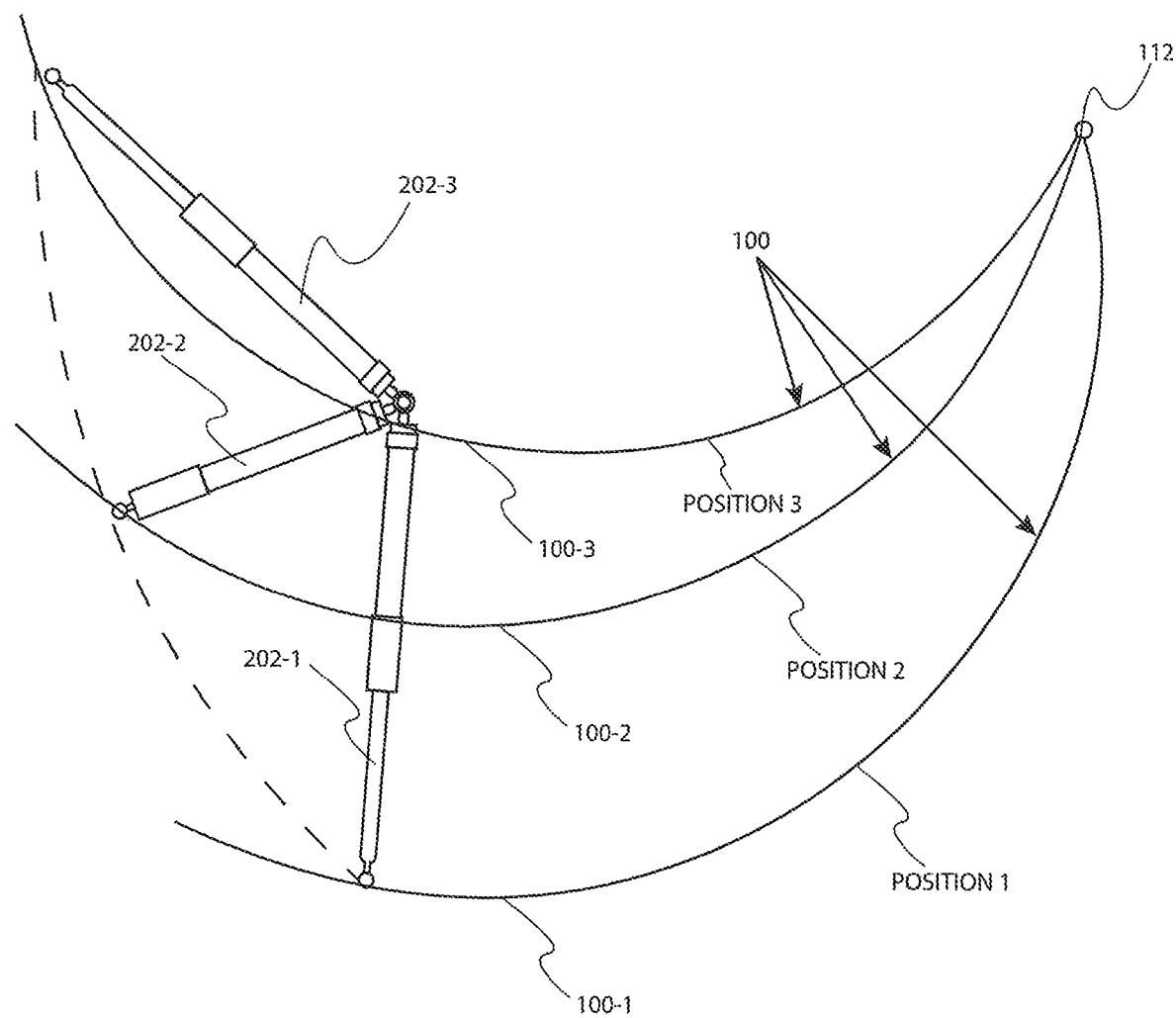
FIG. 24 illustrates an exemplary application of the hold open rod along with the kinematics of the hold open rod in relation to the kinematics of a particular application in accordance with an aspect of the disclosure.

In another aspect, the door 100 may be configured to move from a closed upper position to an open lower position (see FIG. 24).

In one aspect, the hold open rod 202 may be arranged in a stowed position and as the door 100 opens, the hold open rod 202 retracts, and the damping mechanism may be active.

In one aspect, the hold open rod 202 and damping mechanism may be configured such that as the door 100 opens, while the hold open rod 202 reaches a minimum length, the damping mechanism may be active.

In one aspect, the hold open rod 202 and damping mechanism may be configured such that as the door opens, the hold open rod 202 extends, and the damping mechanism may be active.

In one aspect, the hold open rod 202 and damping mechanism may be configured such that as the door opens, the hold open rod 202 locks in an extended length configuration. Thereafter, when an unlock sequence begins, the damping mechanism may be deactivated.

In one aspect, the hold open rod 202 and damping mechanism may be configured such that as the door closes, the hold open rod 202 retracts, and the damping mechanism may be inactive.

In one aspect, the hold open rod 202 and damping mechanism may be configured such that as the door closes, the hold open rod 202 reaches a minimum length, and the damping mechanism may be inactive.

In one aspect, the hold open rod 202 and damping mechanism may be configured such that as the door closes, the hold open rod 202 extends, and the damping mechanism is inactive.

In one aspect, the hold open rod 202 and damping mechanism may be configured such that as the door closes, the hold open rod 202 reaches a stowed length, and the damping mechanism may be activated.

In one aspect, the damping mechanism slows the movement of the door 100 towards the open position when the hold open rod 202 is unlocked.

Figure 3:
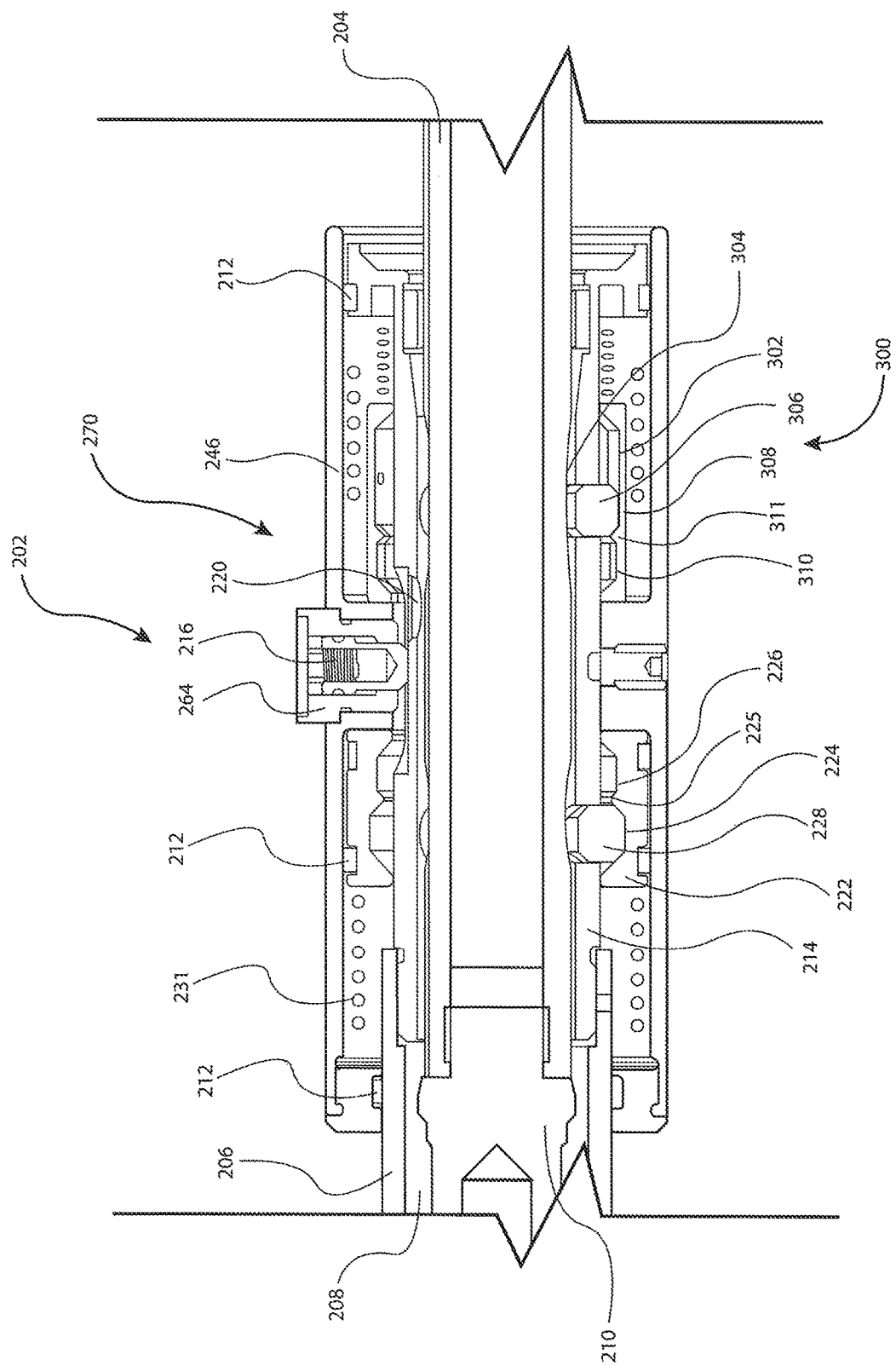
FIG. 3 illustrates a partial cross-sectional view of a hold open rod in a stowed configuration according to one aspect of the disclosure.

FIG. 3 illustrates a partial cross-sectional view of a hold open rod in a stowed configuration according to one aspect of the disclosure. The inner tube 204 may be configured to fit into a cavity 208 of the outer tube 206. The inner tube 204 may have a tube stop 210. The tube stop 210 may prevent the hold open rod 202 from extending to a point where the inner tube 204 comes out of and separates from the outer tube 206. The tube stop 210 may be attached to the inner tube 204 in a variety of ways. For example, a pin, dowel, or the like may be used to connect the tube stop 210 to the inner tube 204. In other aspects, the tube stop 210 may be attached by an adhesive, a mechanical fastener, threads, or another method known in the art. Alternatively, the tube stop 210 may be integrated into the inner tube 204.

The hold open rod 202 may also include a lock body 214 attached at an end of the outer tube 206. The lock body 214 may receive a detent pin 216. The detent pin 216 may have a substantially flat bottom surface to minimize wear on the lock body 214, the inner tube 204, the outer tube 206, and other structures. The detent pin 216 may be located at a central portion 270 of the lock body 214. The detent pin 216 may be housed in a portion 264 of an outer collar 246. The outer collar 246 may be configured to slide a limited amount over the lock body 214. The portion 264 may be a cylindrical housing that houses the detent pin 216. The portion 264 may further include a cylindrical inner portion having a spring arranged above the detent pin 216 to urge the detent pin 216 toward a groove 220. When the hold open rod 202 is in a stowed position, the detent pin 216 is disengaged from the groove 220 of the lock body 214. The detent pin 216 may engage the groove 220 during an unlocking process of the hold open rod 202, described in more detail below. In one aspect, the outer collar 246 may be configured as two components that may be configured to be fastened together, for example, by corresponding threaded portions.

The lock body 214 and the outer collar 246 may also include a locking collar 222. The locking collar 222 may have a generally cylindrical structure that surrounds the inner tube 204 as well as the lock body 214. The locking collar 222 may be arranged inside the outer collar 246 as illustrated.

The locking collar 222 may have an unlock groove 224 and a lock groove 226 with a no-unlock feature 225 arranged between the unlock groove 224 and lock groove 226. The no-unlock feature 225 may be a structure formed on the locking collar 222 separating the unlock groove 224 and the lock groove 226. A locking dog 228 may be configured to fit into and/or slide between the unlock groove 224 and lock groove 226. The no-unlock feature 225 may prevent the locking dog 228 from inadvertently sliding between the unlock groove 224 and lock groove 226. The no-unlock feature 225 may be a structural portion located between the unlock groove 224 and lock groove 226. When the hold open rod 202 is in a stowed position, the locking dog 228 rests in the unlock groove 224. This allows the inner tube 204 to be extended when desired.

The unlock groove 224, the lock groove 226, the no-unlock feature 225, and the locking dog 228 may include chamfered, beveled, or curved radiused edges to assist in the movement of the locking dog 228 between the unlock groove 224 and the lock groove 226. The locking dog 228 may be formed from a linear element, such as a hexagonal prism, a segmented circle, a portion of a cylindrical ring, or cylinder, each may be configured with filleted portions, radiused portions, and/or beveled edges. Although only one locking dog 228 is shown in FIG. 3, in some aspects, it may be desired to have additional locking dogs 228 to assist in the operation of the hold open rod 202. The locking dog 228 may be made from a polyamide-imide material, such as TORLON®, or a metal, such as an aluminum alloy, a copper alloy, steel, or the like. The locking dog 228 may also be reinforced with glass fiber, carbon fiber, or the like.

The hold open rod 202 may also include an inner collar spring 231 arranged on a side of the locking collar 222. In various aspects, the inner collar spring 231 may be a standard coil spring, a wave spring, or another type of spring known in the art. The inner collar spring 231 may exert a force on one side of the locking collar 222 and urge the locking collar 222 to move toward the right as shown in FIG. 3. The force of the inner collar spring 231 is utilized in the locking and unlocking operations of the hold open rod 202 and discussed in more detail below. The lock body 214 may be fitted onto the outer tube 206 utilizing threads, adhesive, mechanical fastener, or the like.

The hold open rod 202 may include a plurality of wear rings 212. It may desirable to place wear rings at various locations along the hold open rod 202, such as around the inner tube 204, the outer tube 206, the tube stop 210, the locking collar 222, and the like. The wear rings 212 may help improve and smooth the operation of the hold open rod 202 and decrease wear to the various aspects of the hold open rod 202. The wear rings 212 may also help prevent intrusion of sand, dust, fluids, such as water, hydraulic fluid, lubricants, or the like, during the life of the hold open rod 202. The wear rings may be made from a polyamide or polyamide-imide material, such as Nylon, TORLON®, or another suitable material.

The hold open rod 202 may include a damping mechanism 300. In one aspect, the damping mechanism 300 may be configured to mechanically damp or slow movement of the inner tube 204 while retracting into the outer tube 206. In one aspect, the damping mechanism 300 may be configured to mechanically damp or slow movement of the inner tube 204 while extending out of the outer tube 206. In one aspect, the damping mechanism 300 may be configured to mechanically damp or slow movement of the inner tube 204 while retracting into the outer tube 206 and the damping mechanism 300 may be configured to mechanically damp or slow movement of the inner tube 204 while extending out of the outer tube 206.

The damping mechanism 300 may include a damping collar 308. The damping collar 308 may have a generally cylindrical structure that surrounds the inner tube 204 as well as the lock body 214. The damping collar 308 may be arranged inside the outer collar 246 as illustrated.

The damping collar 308 may have a damping groove 310 and non-damping groove 302 and may include a feature 311 arranged between the damping groove 310 and non-damping groove 302. The feature 311 may be a structure formed on the inner surface of the damping collar 308 separating the damping groove 310 and the non-damping groove 302. A damping dog 306 may be configured to fit into and/or slide between the damping groove 310 and non-damping groove 302. The feature 311 may prevent the damping dog 306 from inadvertently sliding between the damping groove 310 and non-damping groove 302. The feature 311 may be a raised structural portion located between the damping groove 310 and non-damping groove 302. Moreover, as illustrated in FIG. 3, the damping dog 306 extends through an aperture of the lock body 214. In this regard, the damping dog 306 when damping applies a pressure to an outer surface 304 of the inner tube 204. Alternatively, when the damping dog 306 is not damping it is not applying a pressure to the outer surface 304 of the inner tube 204. In one aspect, when the hold open rod 202 is being damped, the damping dog 306 rests in the damping groove 310 and contacts the outer surface 304. In one aspect, when the hold open rod 202 is not being damped, the damping dog 306 rests in the non-damping groove 302.

As shown in FIG. 3, the hold open rod 202 is not being damped and the damping dog 306 rests in the non-damping groove 302. In this configuration, the inner tube 204 may be extended or retracted from the outer tube 206 with a reduced amount of force. This allows maintenance personnel to easily open or close a component, such as a door.

The damping groove 310, the non-damping groove 302, the feature 311, and the damping dog 306 may include chamfered, beveled, or curved radiused edges to assist in the movement of the damping dog 306 between the damping groove 310 and the non-damping groove 302. The damping dog 306 may be formed from a linear element, such as a hexagonal prism, a segmented circle, a portion of a cylindrical ring, or cylinder, each with filleted portions, radiused portions, and/or beveled edges. Although only one damping dog 306 is shown in FIG. 3, in some aspects, it may be desired to have additional damping dogs 306 to assist in the damping operation of the hold open rod 202. The damping dog 306 may be made from a polyamide-imide material, such as TORLON®, or a metal, such as an aluminum alloy, a copper alloy, steel, or the like. The damping dog 306 may also be reinforced with glass fiber, carbon fiber, or the like.

FIG. 4 includes FIG. 4A and FIG. 4B and illustrates side views of the hold open rod of FIG. 3.

FIG. 4 illustrates that the hold open rod 202 may have rod ends 236 located at ends of the inner tube 204 and the outer tube 206. The rod ends 236 may be any suitable fitting for attachment to the door 100, a frame of the door 100, or another similar surface. For example, the rod ends 236 may be eye bolts, rod end bearings, universal joints, clevis pins, quick disconnects, and the like. The rod ends 236 may be secured onto the inner tube 204 and/or outer tube 206 in any suitable manner. For example, the rod ends 236 may be threaded into a tapped bore, press fit, locked via a setscrew, or another similar method. To further secure the rod ends 236, a lock nut may also be utilized. In one aspect, the rod ends 236 may be connected to a bracket utilizing Murphy proof bolts.

As illustrated in FIG. 4B, the hold open rod 202 may be configured with an unlocked indicator 244 on the lock body 214 that becomes visible when the hold open rod 202 is unlocked. The unlocked indicator 244 may be a visual indicator at a first end 218 of the lock body 214, such as a colored stripe or pattern, which becomes exposed when the hold open rod 202 is in a stowed and/or unlocked position. For example, the unlocked indicator 244 may be a red stripe. The unlocked indicator 244 may also be a tactile indicator, such as a knurled pattern, that is formed onto the lock body 214. A tactile indicator may allow maintenance personnel to determine the hold open rod 202 is unlocked in situations where visual observation of the unlocked indicator 244 is not possible, such as if the view is obstructed by another object or if there is insufficient lighting. The unlocked indicator 244 may also be an illuminated pattern, such as formed from a fluorescent, phosphorescent, electroluminescent, or radioluminescent paint. The unlocked indicator 244 may also be a combination of a visual indicator and a tactile indicator.

As illustrated in FIG. 4A, the hold open rod 202 may be configured with a locked indicator 245 on the lock body 214 that becomes visible when the hold open rod 202 is locked. The locked indicator 245 may be a visual indicator at a second end 219 of the lock body 214, such as a colored stripe or pattern, which becomes exposed when the hold open rod 202 is in a locked configuration. For example, the locked indicator 245 may be a green stripe. The locked indicator 245 may also be a tactile indicator, such as a knurled pattern, that is formed onto the lock body 214. A tactile indicator may allow maintenance personnel to determine the hold open rod 202 is locked in situations where visual observation of the locked indicator 245 is not possible, such as if the view is obstructed by another object or if there is insufficient lighting. The locked indicator 245 may also be an illuminated pattern, such as formed from a fluorescent, phosphorescent, electroluminescent, or radioluminescent paint. The locked indicator 245 may also be a combination of a visual indicator and a tactile indicator.

Figure 5:
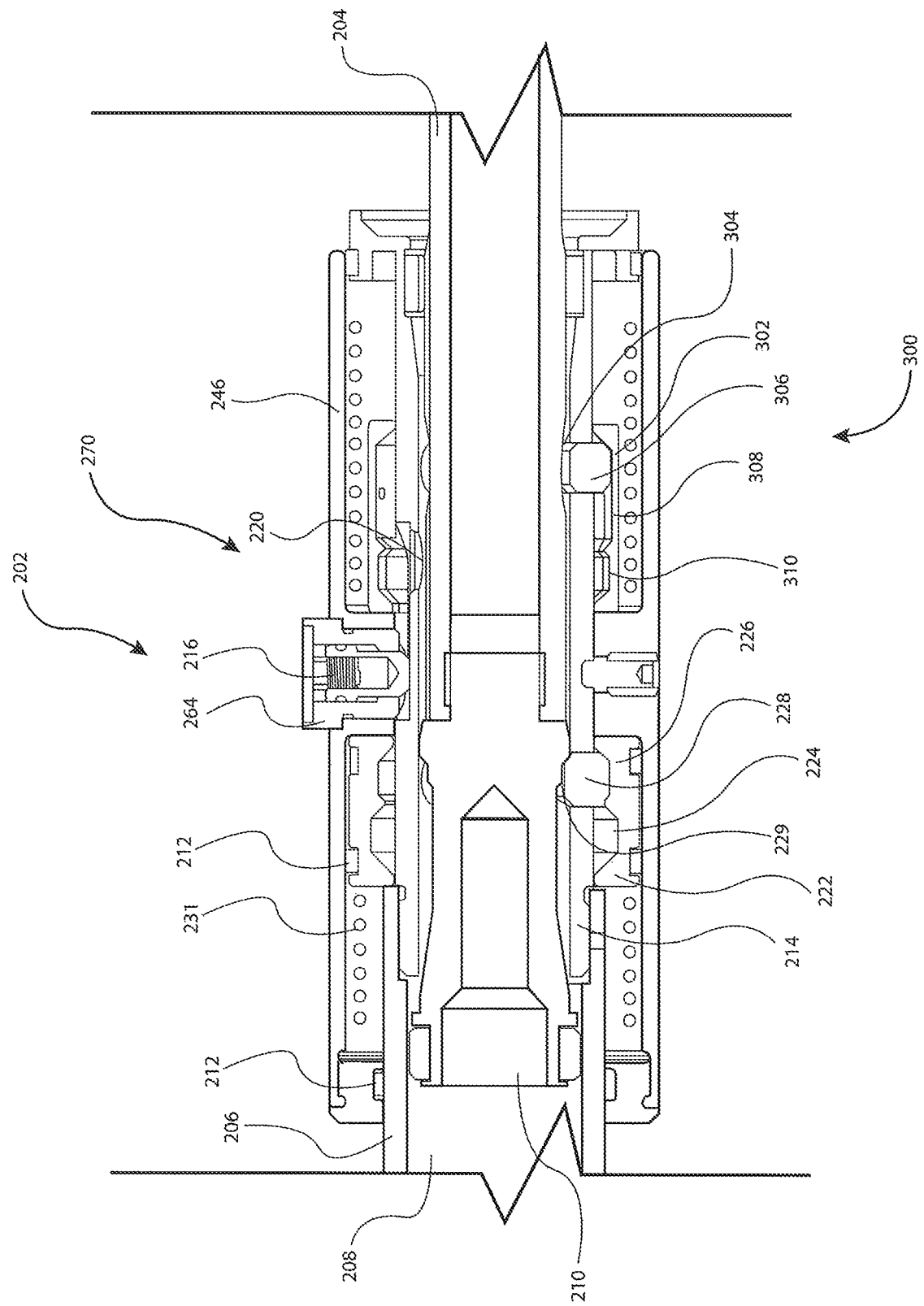
FIG. 5 illustrates a partial cross-sectional view of an extended and locked configuration of the hold open rod in accordance with an aspect of the disclosure.

FIG. 5 illustrates a partial cross-sectional view of an extended and locked configuration of the hold open rod in accordance with an aspect of the disclosure. In this regard, the inner tube 204 may be extended (towards the right) from the outer tube 206 until it reaches a desired length. As the hold open rod 202 extends, the inner tube 204 may move until the lock body 214 moves and correspondingly moves the locking dog 228 into the lock groove 226 and the locking dog 228 comes into contact with an inner lock groove 229 on the outside surface the tube stop 210. Once the locking dog 228 contacts the inner lock groove 229, the hold open rod 202 is extended and locked.

As previously discussed, the damping mechanism 300 is configured to position of the damping dog 306 in the non-damping groove 302 when the hold open rod 202 is stowed as shown in FIG. 3. As the hold open rod 202 moves to the extended and locked configuration illustrated in FIG. 5, the damping mechanism 300 is configured to maintain the damping dog 306 in the non-damping groove 302 while the hold open rod 202 is extended as shown in FIG. 5. Additionally, the outer surface 304 of the inner tube 204 may include a relief portion that may be implemented as a reduced diameter portion of the inner tube 204. This relief portion allows the damping dog 306 to more easily move from one position to another position.

Figure 6:
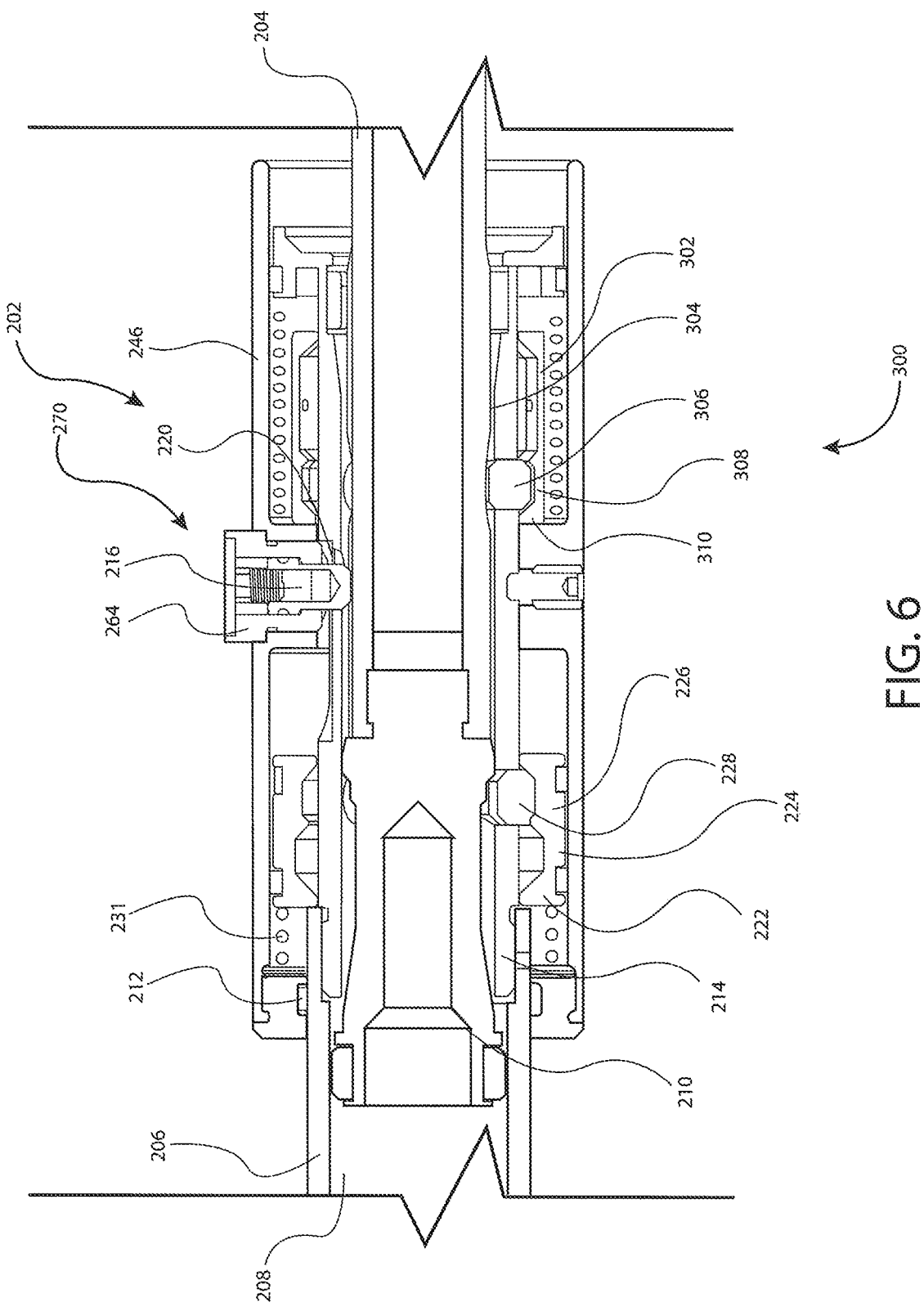
FIG. 6 illustrates a partial cross-sectional view of an extended, locked, and primary lock defeated configuration of the hold open rod in accordance with an aspect of the disclosure.

FIG. 6 illustrates a partial cross-sectional view of an extended, locked, and primary lock defeated configuration of the hold open rod in accordance with an aspect of the disclosure. In particular, FIG. 6 shows that the outer collar 246 has been manually moved toward the right to place the detent pin 216 over the groove 220. In this position, the detent pin 216 may extend into the groove 220.

Thereafter, the outer collar 246 moves the lock body 214 to the left. Movement of the lock body 214 moves to the damping dog 306 from the non-damping groove 302 to the damping groove 310. Thereafter, the damping mechanism 300 may provide damping to movement of the inner tube 204.

Figure 7:
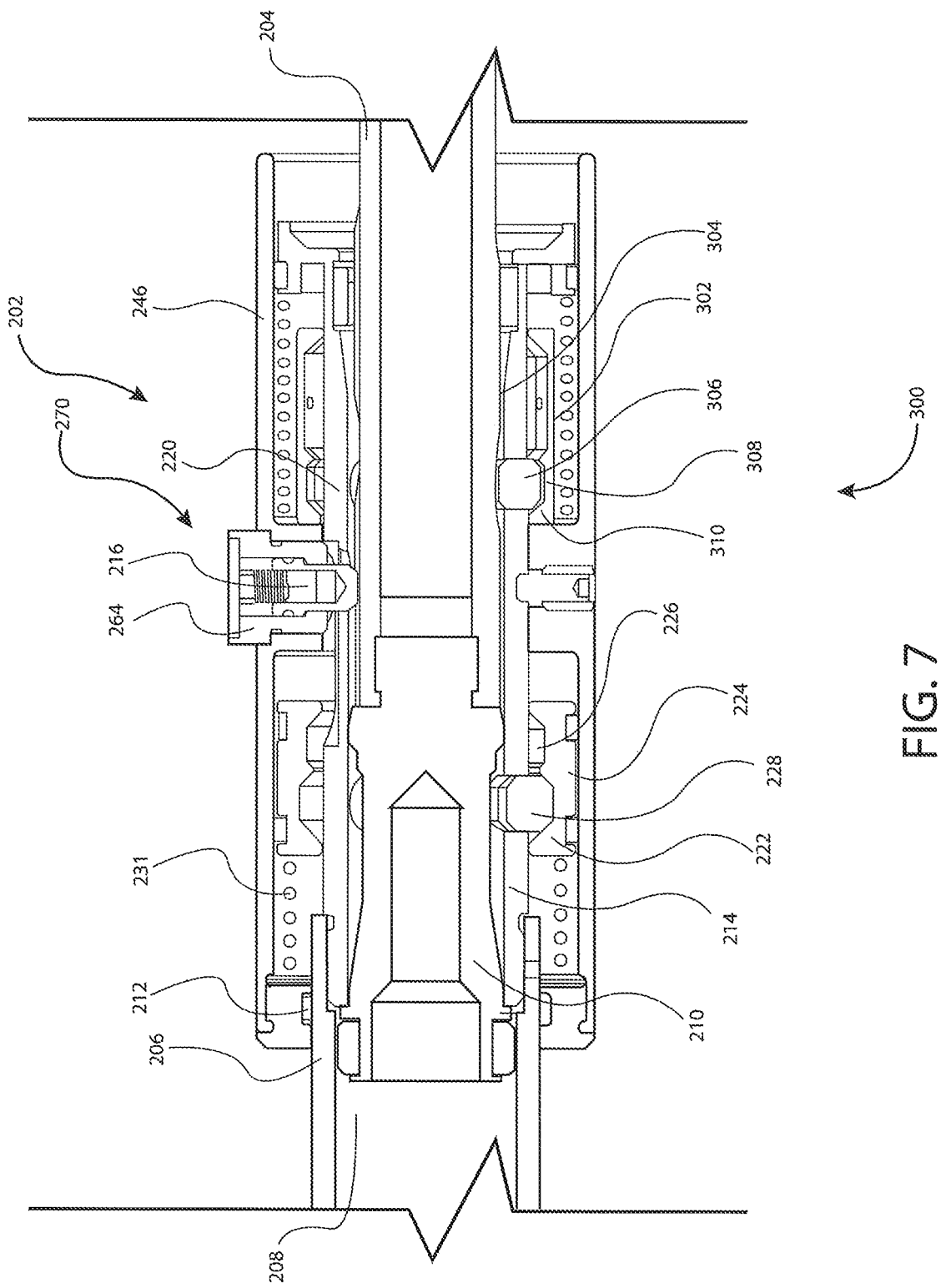
FIG. 7 illustrates a partial cross-sectional view of an unlocked configuration of the hold open rod in accordance with an aspect of the disclosure.

FIG. 7 illustrates a partial cross-sectional view of an unlocked configuration of the hold open rod in accordance with an aspect of the disclosure. In particular, the detent pin 216 is engaged with the groove 220 and further manual movement of the inner tube 204 moves the locking dog 228 into the unlock groove 224. The arrangement of the locking dog 228 in the unlock groove 224 unlocks the hold open rod 202 and allows for movement of the inner tube 204 into the cavity 208 of the outer tube 206.

Additionally, as previously noted the damping dog 306 may be arranged in the damping groove 310. This forces the damping dog 306 to contact an outer surface 304 of the inner tube 204 providing mechanical damping to the movement of the inner tube 204 into the outer tube 206.

Figure 8:
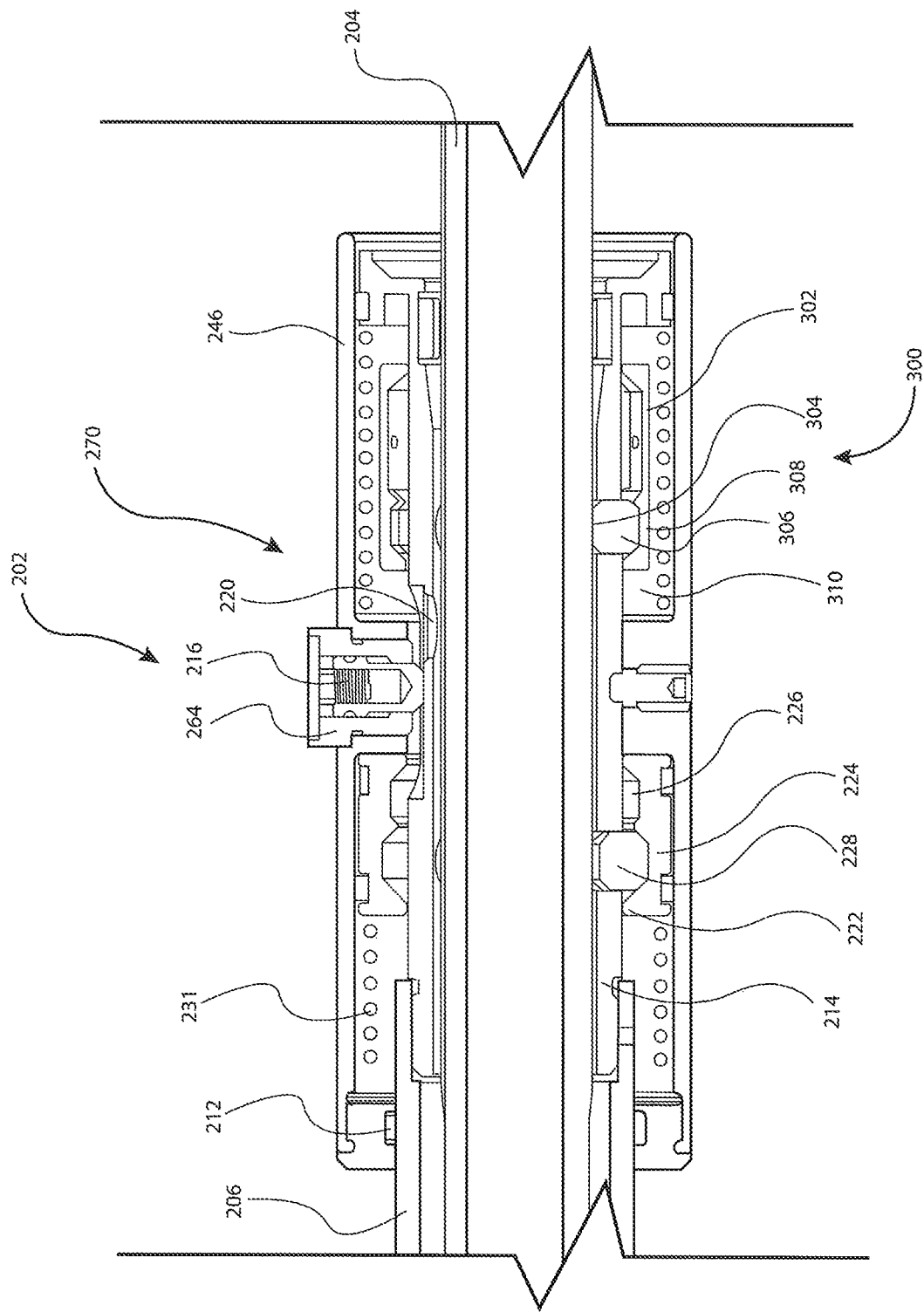
FIG. 8 illustrates a partial cross-sectional view of a damped configuration of the hold open rod in accordance with an aspect of the disclosure.

FIG. 8 illustrates a partial cross-sectional view of a damped configuration of the hold open rod in accordance with an aspect of the disclosure. In particular, FIG. 8 illustrates the hold open rod 202 with the damping dog 306 arranged in the damping groove 310. This forces the damping dog 306 to contact the outer surface 304 of the inner tube 204 providing mechanical damping to the movement of the inner tube 204 into the outer tube 206. This arrangement slows movement of the inner tube 204 into the outer tube 206 thus reducing the likelihood of injuries to maintenance personnel and damage to the component, surrounding components, the hold open rod 202, and the like.

Figure 9:
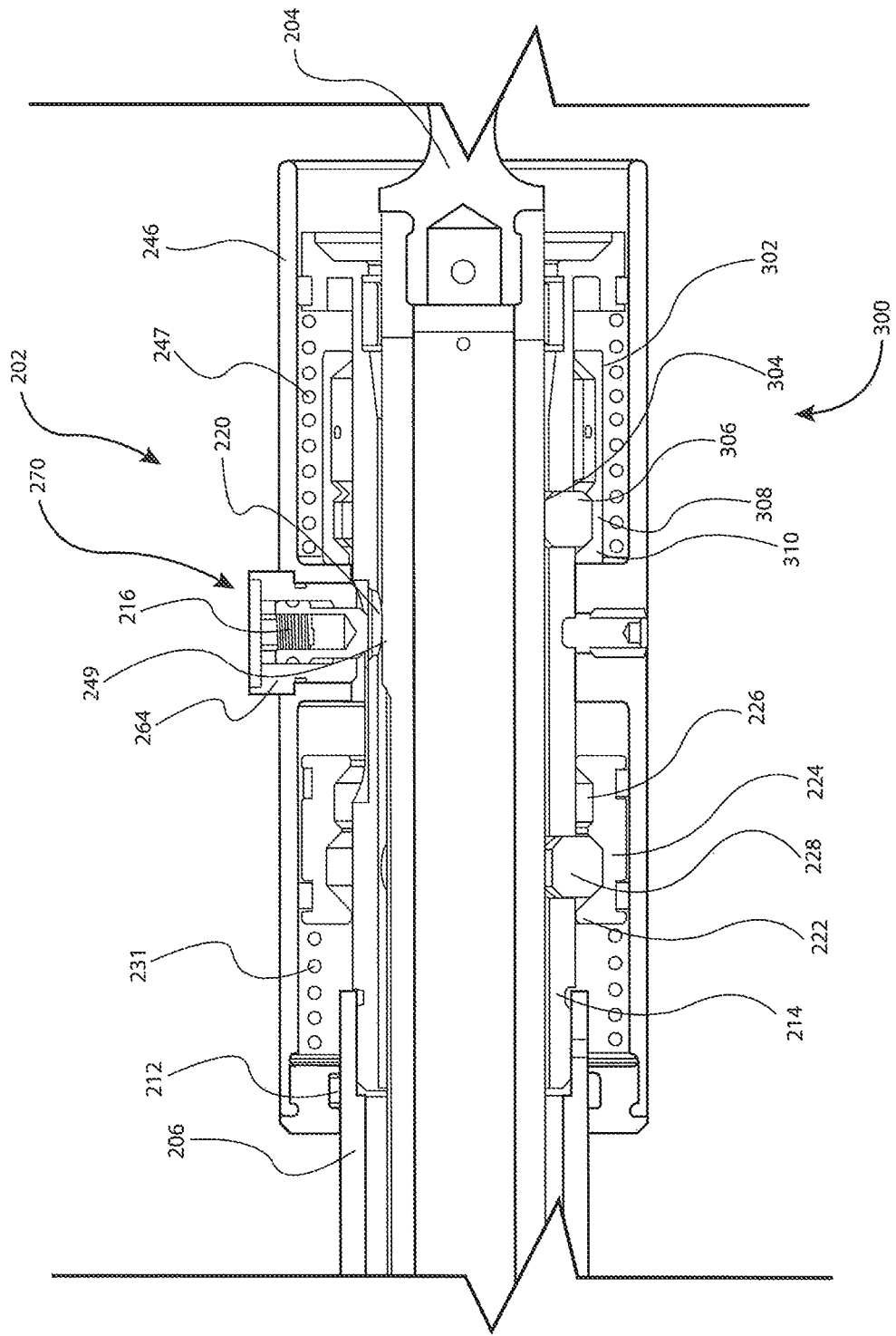
FIG. 9 illustrates a partial cross-sectional view of a pin actuated configuration of the hold open rod in accordance with an aspect of the disclosure.

FIG. 9 illustrates a partial cross-sectional view of a pin actuated configuration of the hold open rod in accordance with an aspect of the disclosure. In particular, FIG. 9 illustrates the functionality when the inner tube 204 is almost fully retracted into the outer tube 206. The inner tube 204 may include a ramped portion 249 at the end thereof adjacent the groove 220. The ramped portion 249 may force the detent pin 216 upwards into the portion 264. This releases the outer collar 246 from the lock body 214. Thereafter, the outer collar 246 may move with respect to the lock body 214 in response to a force provided by the inner collar spring 231 and/or a spring 247.

Figure 10:
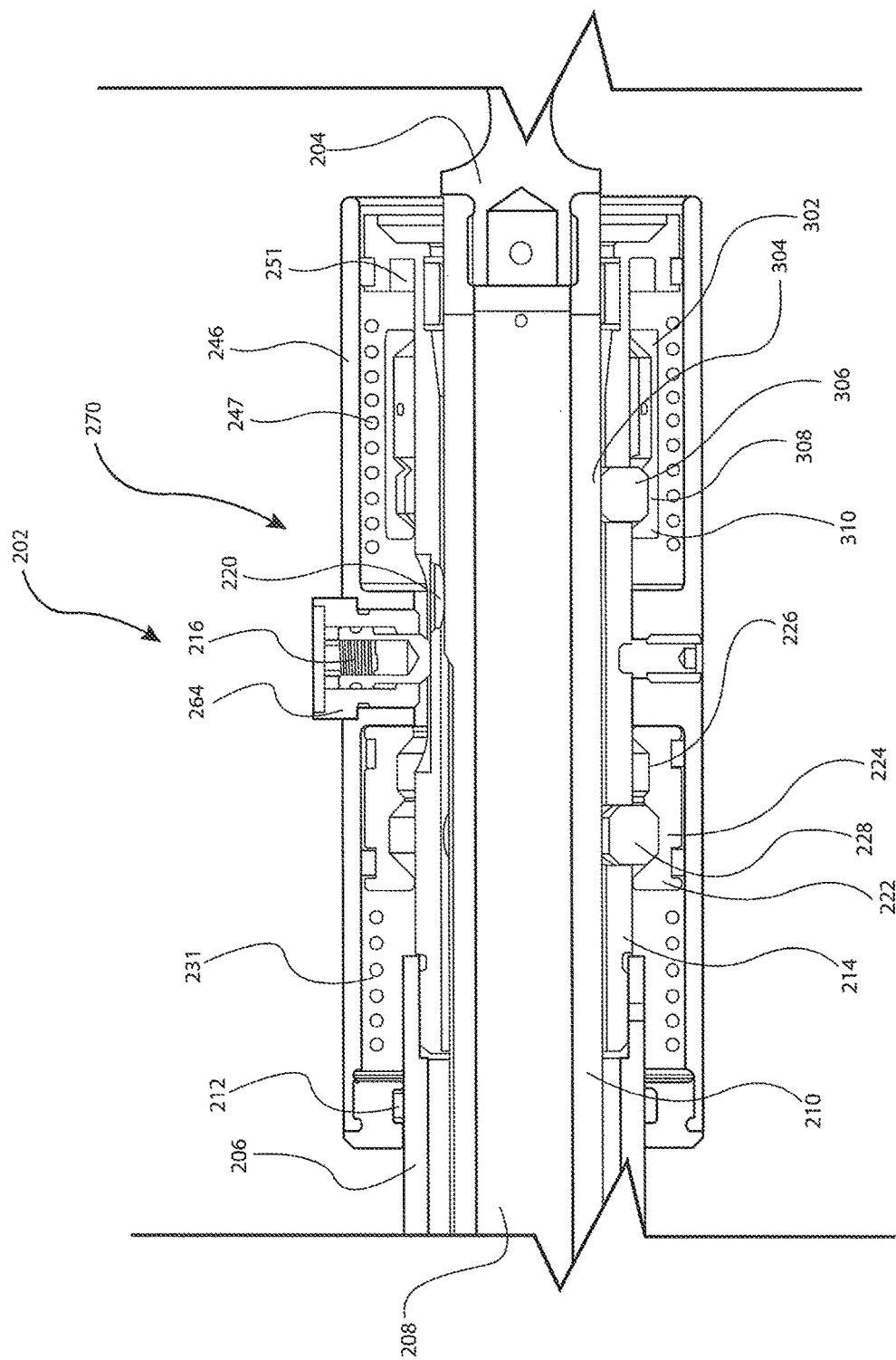
FIG. 10 illustrates a partial cross-sectional view of detent pin stowed position configuration of the hold open rod in accordance with an aspect of the disclosure.

FIG. 10 illustrates a partial cross-sectional view of detent pin stowed position configuration of the hold open rod in accordance with an aspect of the disclosure. In particular, FIG. 10 shows that the outer collar 246 has moved with respect to the lock body 214 in response to a force provided by the inner collar spring 231, a spring 251, and/or a spring 247. Thereafter, the hold open rod 202 may be further operated to be placed in the configuration of FIG. 3 for repeated use.

Figure 11:
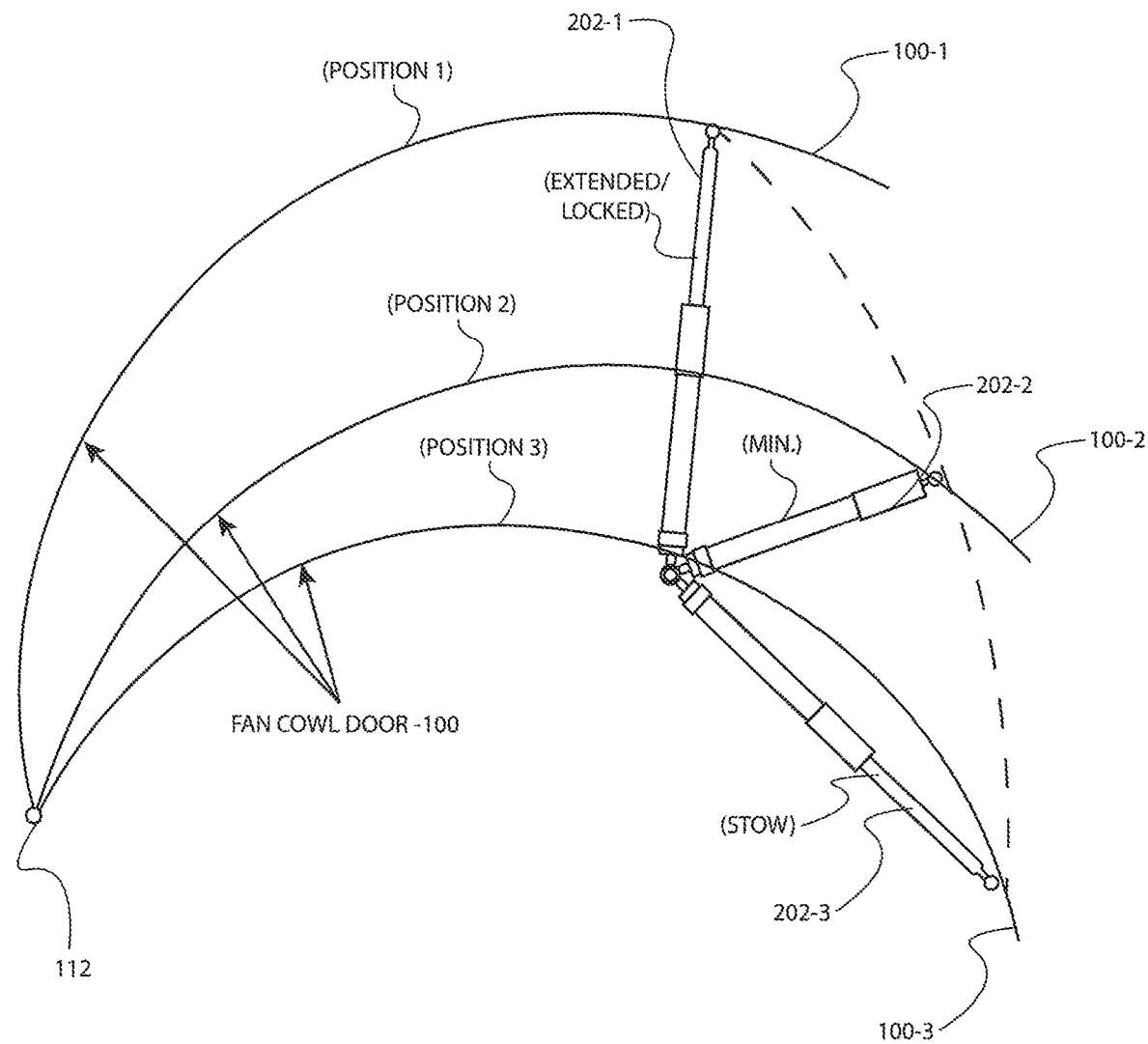
FIG. 11 illustrates an exemplary application of the hold open rod along with the kinematics of the hold open rod in relation to the kinematics of a particular application in accordance with an aspect of the disclosure.

FIG. 11 illustrates an exemplary application of the hold open rod along with the kinematics of the hold open rod in relation to the kinematics of a particular application in accordance with an aspect of the disclosure. In particular, FIG. 11 illustrates an exemplary application of the hold open rod 202 and a component that is a fan cowl door (door 100). In this regard, FIG. 11 illustrates various exemplary positions of the hold open rod 202 and corresponding exemplary positions of the door 100.

In this regard, position 1 relates to the door 100 being in position 100-1 and the hold open rod 202 being in position 202-1 (door 100 open); position 2 relates to the door 100 being in position 100-2 and the hold open rod 202 being in position 202-2 (door 100 opening/closing); and position 3 relates to the door 100 being in position 100-3 and the hold open rod 202 being in position 202-3 (door 100 closed).

In one aspect, when the door 100 and the hold open rod 202 are positioned in position 1, the hold open rod 202 may be extended and locked holding a compressive load.

In one aspect, when the door 100 and the hold open rod 202 are translating from position 1 to position 2, the hold open rod 202 is unlocked, and the damping mechanism 300 may be engaged as the hold open rod 202 approaches a minimum length.

In one aspect, when the door 100 and the hold open rod 202 are positioned in position 2, the hold open rod 202 is unlocked and the damping mechanism 300 may be engaged at a minimum length of the hold open rod 202.

In one aspect, when the door 100 and the hold open rod 202 are translating from position 2 to position 3, the hold open rod 202 may be unlocked and the damping mechanism 300 may be engaged from the minimum length to the stow length.

In one aspect, when the door 100 and the hold open rod 202 are positioned in position 3, the hold open rod 202 is unlocked and the damping mechanism 300 may disengage.

In one aspect, when the door 100 and the hold open rod 202 are translating from position 1 to position 2 to position 3, the hold open rod 202 may be unlocked and the damping mechanism may be configured to be undamped all the way back to the extended and locked position (at position 1).

In one aspect, when the door 100 and the hold open rod 202 are back to being positioned in position 1, the hold open rod 202 may be extended and locked holding a compressive load.

Figure 12:
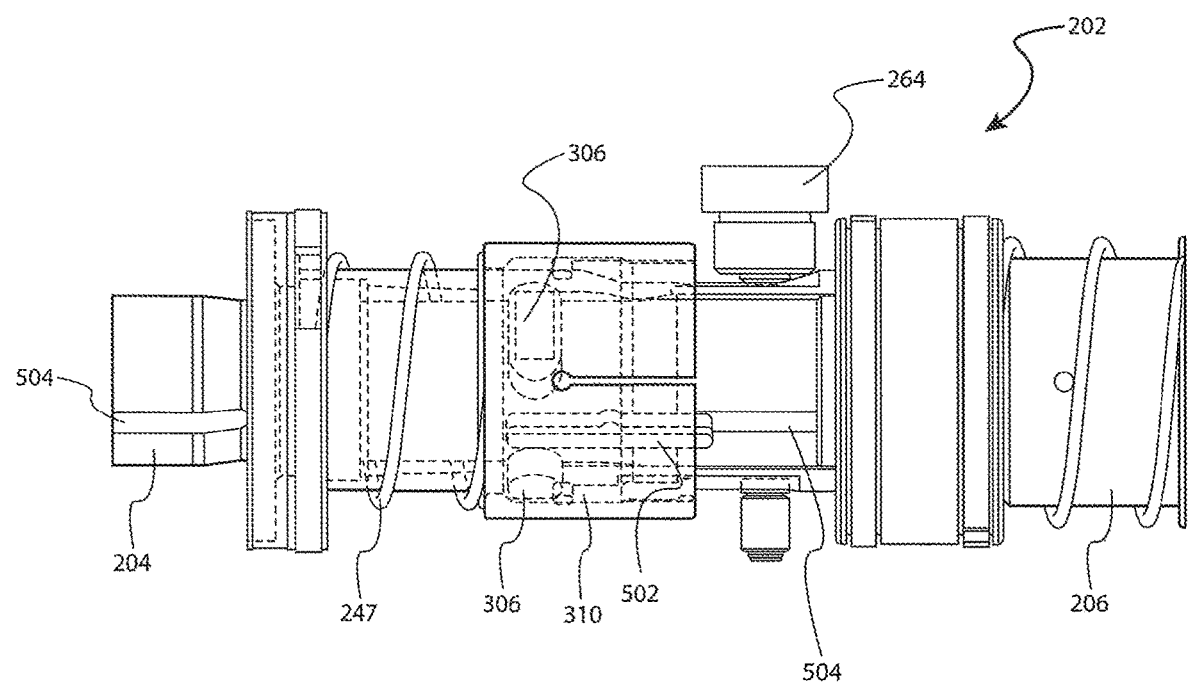
FIG. 12 illustrates a partial side view of the hold open rod in accordance with an aspect of the disclosure.
Figure 13:
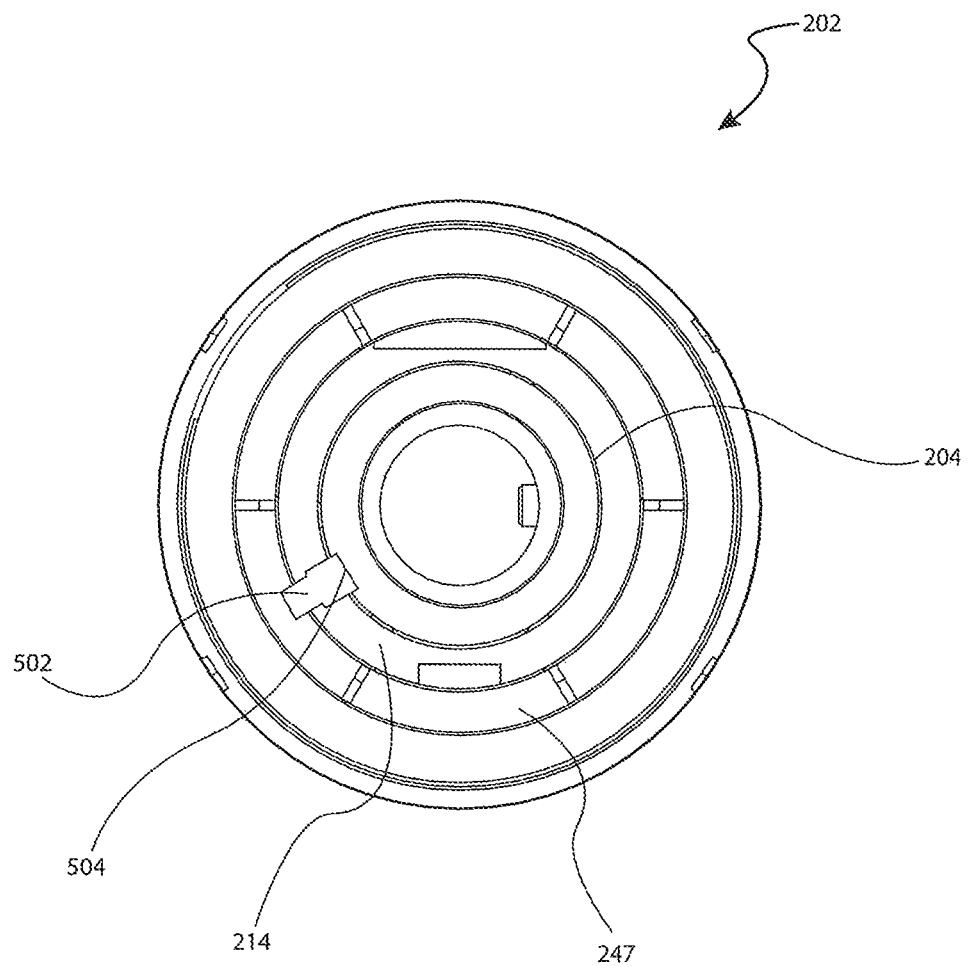
FIG. 13 illustrates a cross-sectional view of the hold open rod in accordance with an aspect of the disclosure.

FIG. 12 illustrates a partial side view of the hold open rod in accordance with an aspect of the disclosure; and FIG. 13 illustrates a cross-sectional view of the hold open rod in accordance with an aspect of the disclosure.

In particular, FIG. 12 and FIG. 13 illustrate an aspect of the hold open rod 202 that includes a key 502 arranged in a key way 504. The outer collar 246 is not shown for clarity. The key 502 and the key way 504 are configured to orientate the inner tube 204, the detent pin 216, the damping collar 308 and/or the like for correct alignment. In this regard, FIG. 13 illustrates plural damping dogs 306 arranged within the damping collar 308 with the key 502 arranged therebetween. The key 502 extends through the lock body 214 and/or the damping collar 308 and engages the key way 504 that is arranged in the surface of the inner tube 204. However, it is contemplated that a key and keyway arrangement may be located in other portions of the hold open rod 202 in order to maintain correct orientation of the various components.

The various aspects illustrated in FIGS. 1-11 may be implemented in a door 100 that moves vertically upward from a closed position to an open position. Hence, the configuration of the hold open rod 202 is configured to damp movement of the door 100 as it moves from the vertically higher open position to the vertically lower closed position. In other words, the hold open rod 202 may damp movement of the door 100 during a closing sequence; and the hold open rod 202 may not damp movement of the door 100 during an opening sequence.

In further aspects illustrated in FIGS. 14-24, the hold open rod 202 may be implemented in a door 100 that moves vertically downward from a closed position to an open position. Hence, the configuration of the hold open rod 202 is configured to damp movement of the door 100 as it moves from the vertically higher closed position to the vertically lower open position as described in further detail below. In other words, the hold open rod 202 may damp movement of the door 100 during an opening sequence; and the hold open rod 202 may not damp movement of the door 100 during a closing sequence. The construction and arrangement of components of the hold open rod 202 in this aspect are generally consistent with the aspect of FIGS. 1-13 with the exception of the configuration of the damping collar 308. The damping collar 308 for this configuration may include the damping groove 310 and non-damping groove 302 reversed to provide the functionality noted above.

Figure 14:
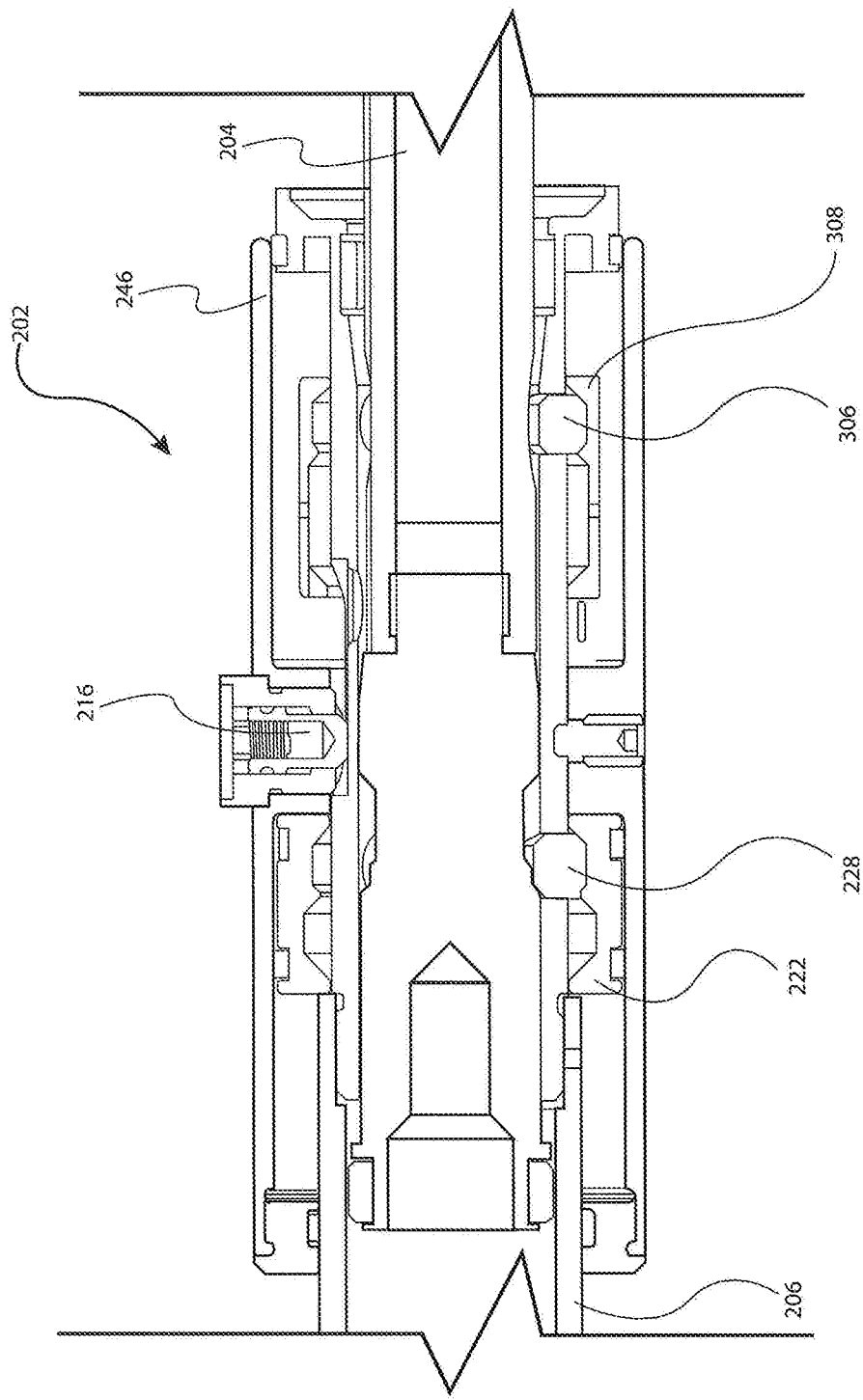
FIG. 14 illustrates a partial cross-sectional view of an extended and locked configuration of the hold open rod in accordance with an aspect of the disclosure.

FIG. 14 illustrates a partial cross-sectional view of an extended and locked configuration of the hold open rod in accordance with an aspect of the disclosure.

In particular, FIG. 14 illustrates the extended and locked configuration of the hold open rod 202 and further illustrates for this configuration a position of the outer tube 206, a position of the inner tube 204, a position of the locking dog 228, a position of the locking collar 222, a position of the damping dog 306, and a position of the damping collar 308. This configuration relates to position 1 illustrated in FIG. 24 below. In this configuration, the damping dog 306 is engaged and the locking locking dog 228 is engaged. Additionally, a tension load is applied to the inner tube 204.

Figure 15:
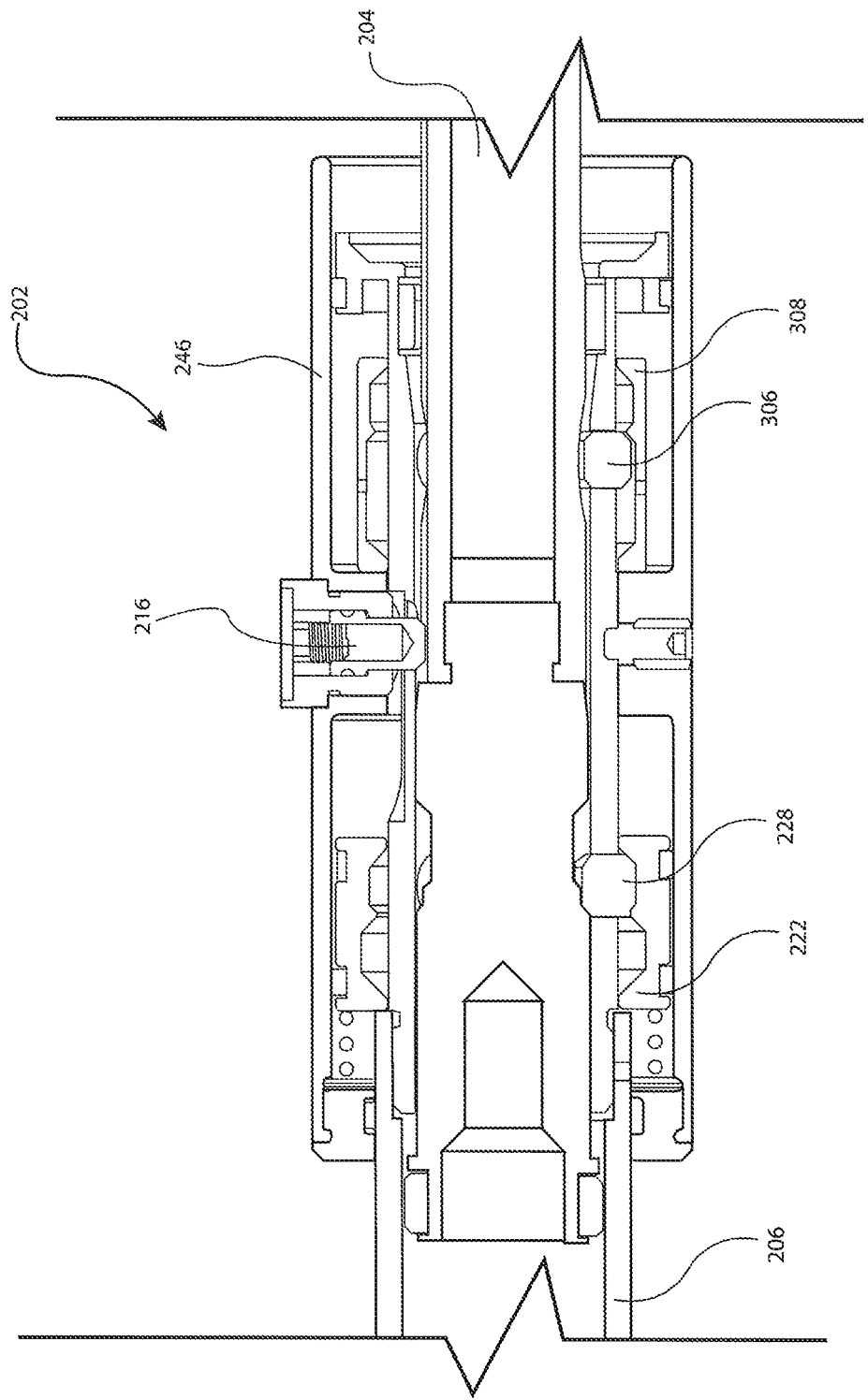
FIG. 15 illustrates a partial cross-sectional view of extended and locked with collar actuated configuration of the hold open rod in accordance with an aspect of the disclosure.

FIG. 15 illustrates a partial cross-sectional view of extended and locked with collar actuated configuration of the hold open rod in accordance with an aspect of the disclosure.

In particular, FIG. 15 illustrates the extended and locked with collar actuated configuration of the hold open rod 202 and further illustrates for this configuration a position of the outer tube 206, a position of the inner tube 204, a position of the locking dog 228, a position of the locking collar 222, a position of the damping dog 306, and a position of the damping collar 308. This configuration relates to position 1 illustrated in FIG. 24 below. In this configuration, the damping dog 306 is disengaged and the locking dog 228 is engaged. Additionally, the detent pin 216 has now been extended.

Figure 16:
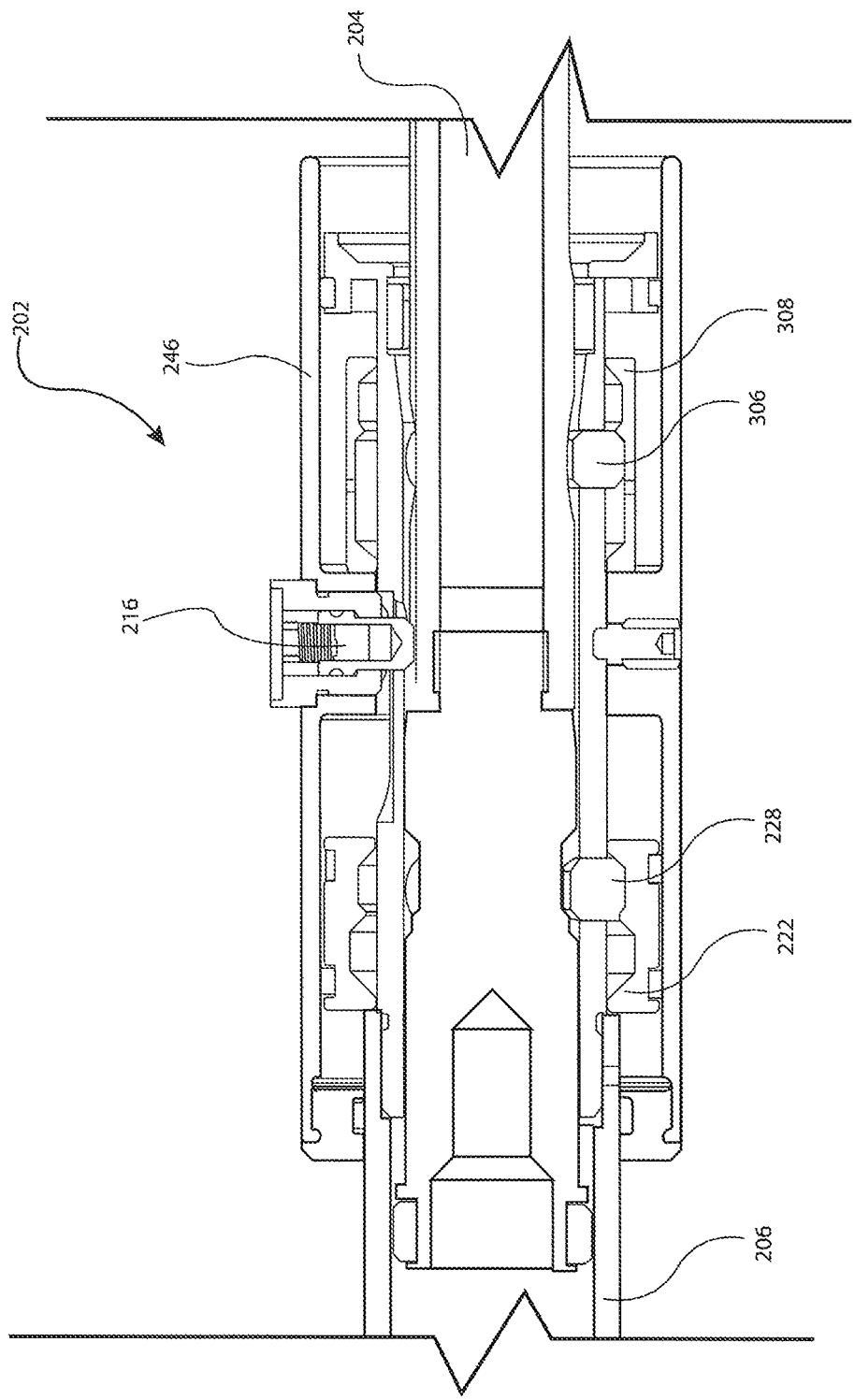
FIG. 16 illustrates a partial cross-sectional view of extended and locked with collar actuated configuration of the hold open rod in accordance with an aspect of the disclosure.

FIG. 16 illustrates a partial cross-sectional view of extended and locked with collar actuated configuration of the hold open rod in accordance with an aspect of the disclosure.

In particular, FIG. 16 illustrates the extended and locked with collar actuated configuration of the hold open rod 202 and further illustrates for this configuration a position of the outer tube 206, a position of the inner tube 204, a position of the locking dog 228, a position of the locking collar 222, a position of the damping dog 306, and a position of the damping collar 308. This configuration relates to position 1 illustrated in FIG. 24 below. In this configuration, the damping dog 306 is disengaged and the locking dog 228 is engaged. Additionally, the detent pin 216 remains extended.

Figure 17:
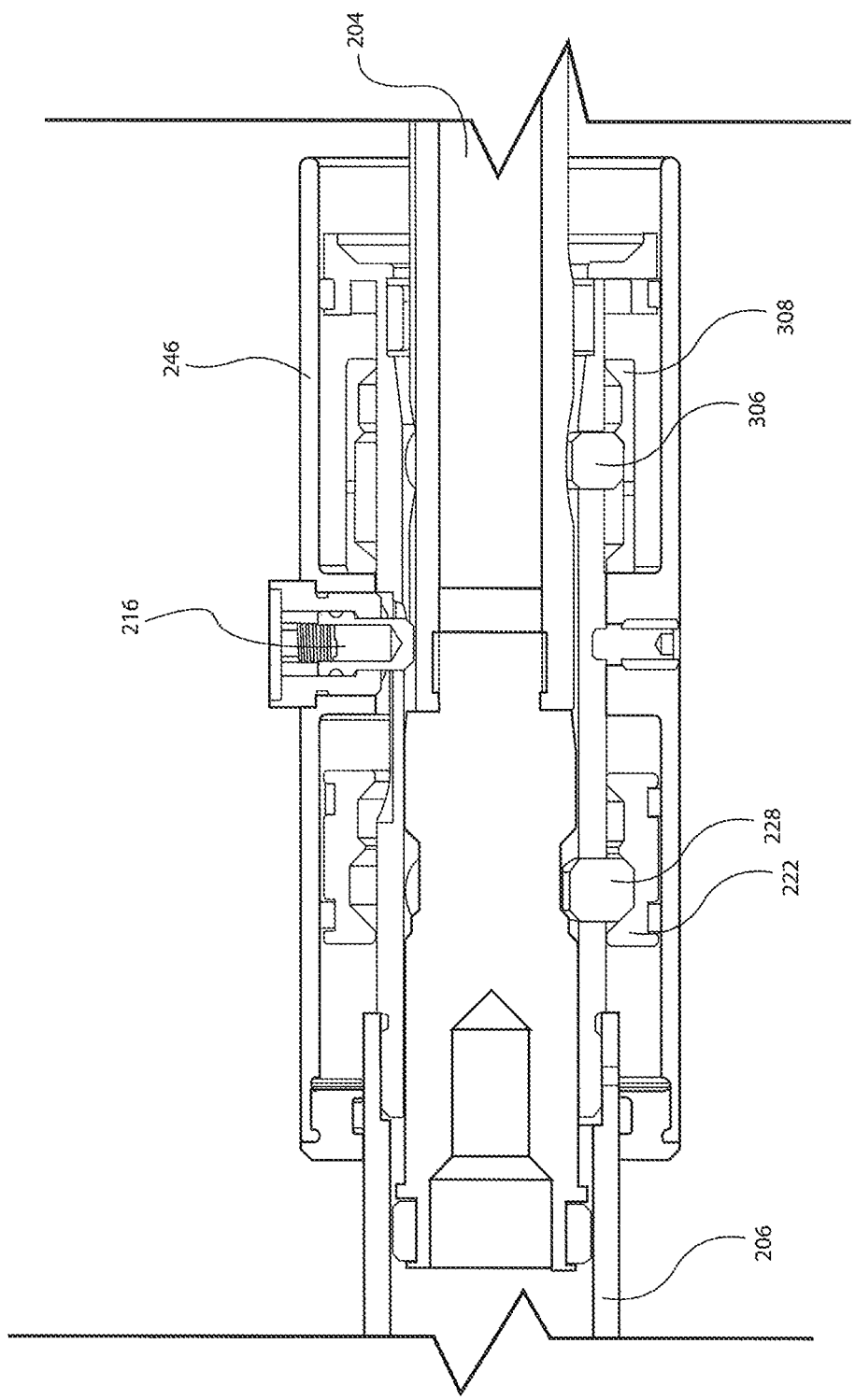
FIG. 17 illustrates a partial cross-sectional view of an extended configuration of the hold open rod in accordance with an aspect of the disclosure.

FIG. 17 illustrates a partial cross-sectional view of an extended configuration of the hold open rod in accordance with an aspect of the disclosure.

In particular, FIG. 17 illustrates the extended configuration of the hold open rod 202 and further illustrates for this configuration a position of the outer tube 206, a position of the inner tube 204, a position of the locking dog 228, a position of the locking collar 222, a position of the damping dog 306, and a position of the damping collar 308. This configuration relates to positions 1-2 illustrated in FIG. 24 below. In this configuration, the damping dog 306 is disengaged and the locking dog 228 is disengaged. Additionally, the tension load has been removed.

Figure 18:
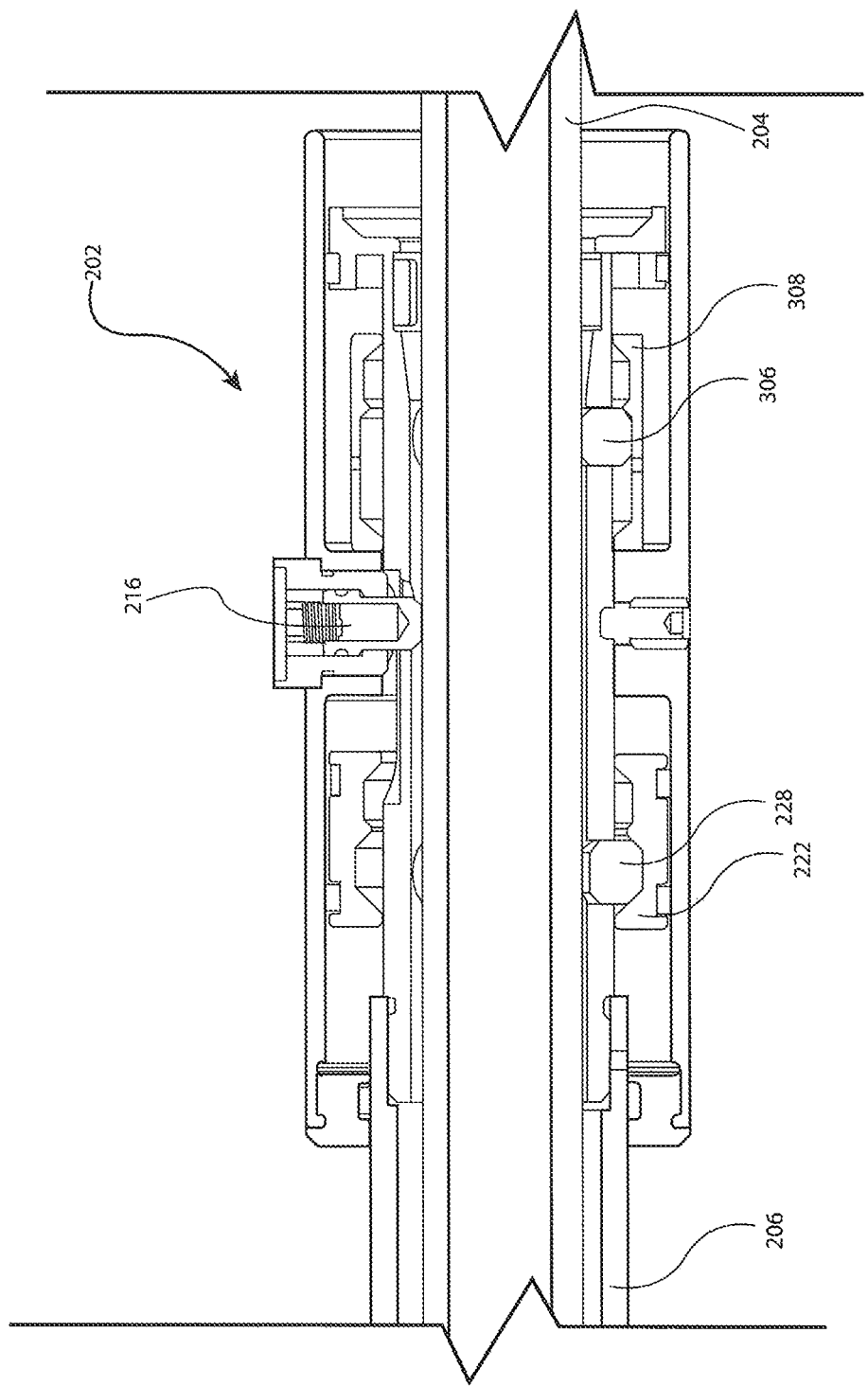
FIG. 18 illustrates a partial cross-sectional view of a retracting configuration of the hold open rod in accordance with an aspect of the disclosure.

FIG. 18 illustrates a partial cross-sectional view of a retracting configuration of the hold open rod in accordance with an aspect of the disclosure.

In particular, FIG. 18 illustrates the retracting configuration of the hold open rod 202 and further illustrates for this configuration a position of the outer tube 206, a position of the inner tube 204, a position of the locking dog 228, a position of the locking collar 222, a position of the damping dog 306, and a position of the damping collar 308. This configuration relates to positions 1-2 illustrated in FIG. 24 below. In this configuration, the damping dog 306 is disengaged and the locking dog 228 is disengaged. Additionally, the inner tube 204 is translating to the left and retracting.

Figure 19:
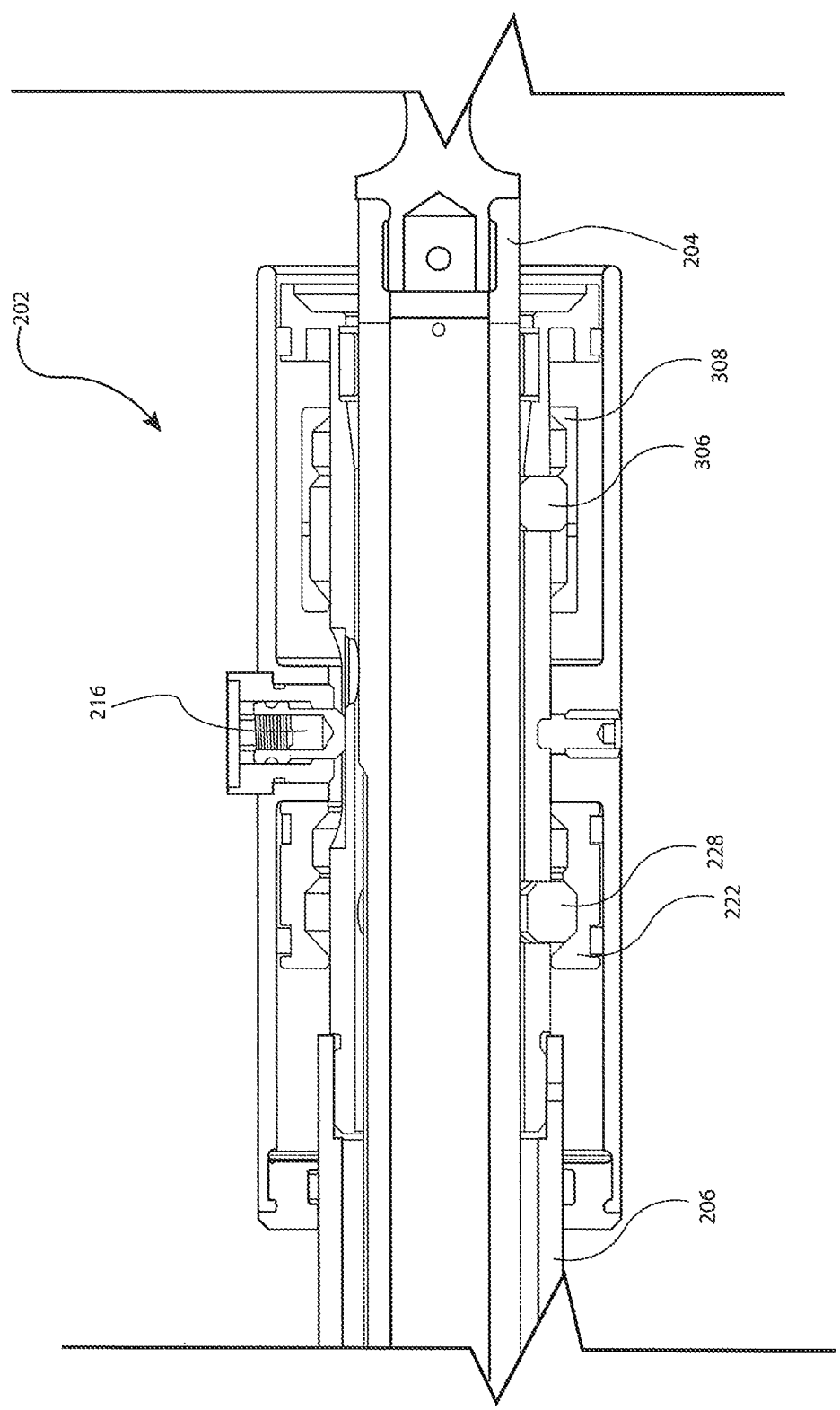
FIG. 19 illustrates a partial cross-sectional view of a minimum length configuration of the hold open rod in accordance with an aspect of the disclosure.

FIG. 19 illustrates a partial cross-sectional view of a minimum length configuration of the hold open rod in accordance with an aspect of the disclosure.

In particular, FIG. 19 illustrates the minimum length configuration of the hold open rod 202 and further illustrates for this configuration a position of the outer tube 206, a position of the inner tube 204, a position of the locking dog 228, a position of the locking collar 222, a position of the damping dog 306, and a position of the damping collar 308. This configuration relates to position 2 illustrated in FIG. 24 below. In this configuration, the damping dog 306 is disengaged and the locking dog 228 is disengaged. Additionally, the inner tube 204 is fully retracted and the detent pin 216 has retracted.

Figure 20:
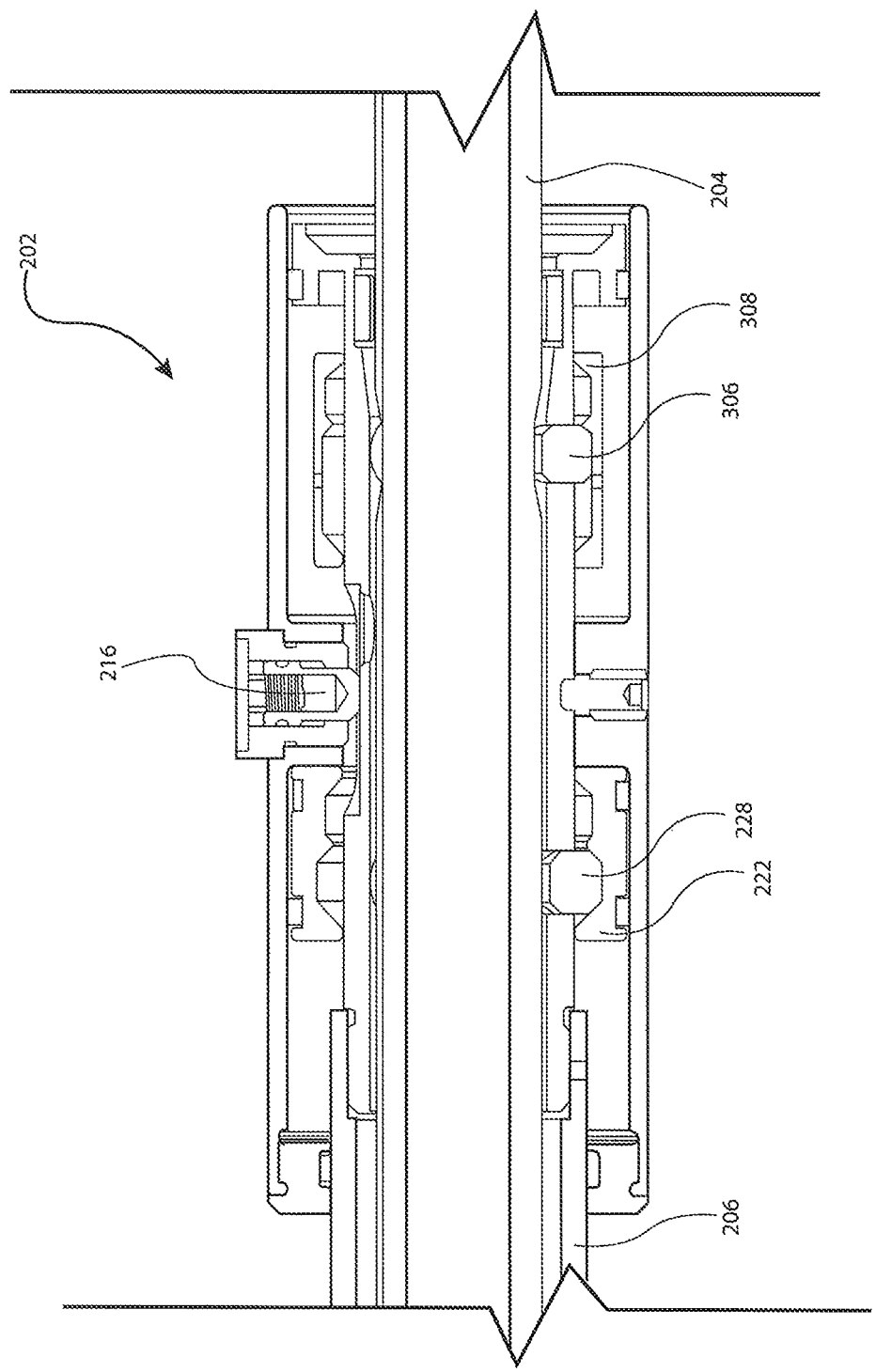
FIG. 20 illustrates a partial cross-sectional view of a minimum length extending to a stow length configuration of the hold open rod in accordance with an aspect of the disclosure.

FIG. 20 illustrates a partial cross-sectional view of a minimum length extending to a stow length configuration of the hold open rod in accordance with an aspect of the disclosure.

In particular, FIG. 20 illustrates the minimum length extending to a stow length configuration of the hold open rod 202 and further illustrates for this configuration a position of the outer tube 206, a position of the inner tube 204, a position of the locking dog 228, a position of the locking collar 222, a position of the damping dog 306, and a position of the damping collar 308. This configuration relates to positions 2-3 illustrated in FIG. 24 below. In this configuration, the damping dog 306 is disengaged and the locking dog 228 is disengaged. Additionally, the inner tube 204 is extending by moving in the right direction.

Figure 21:
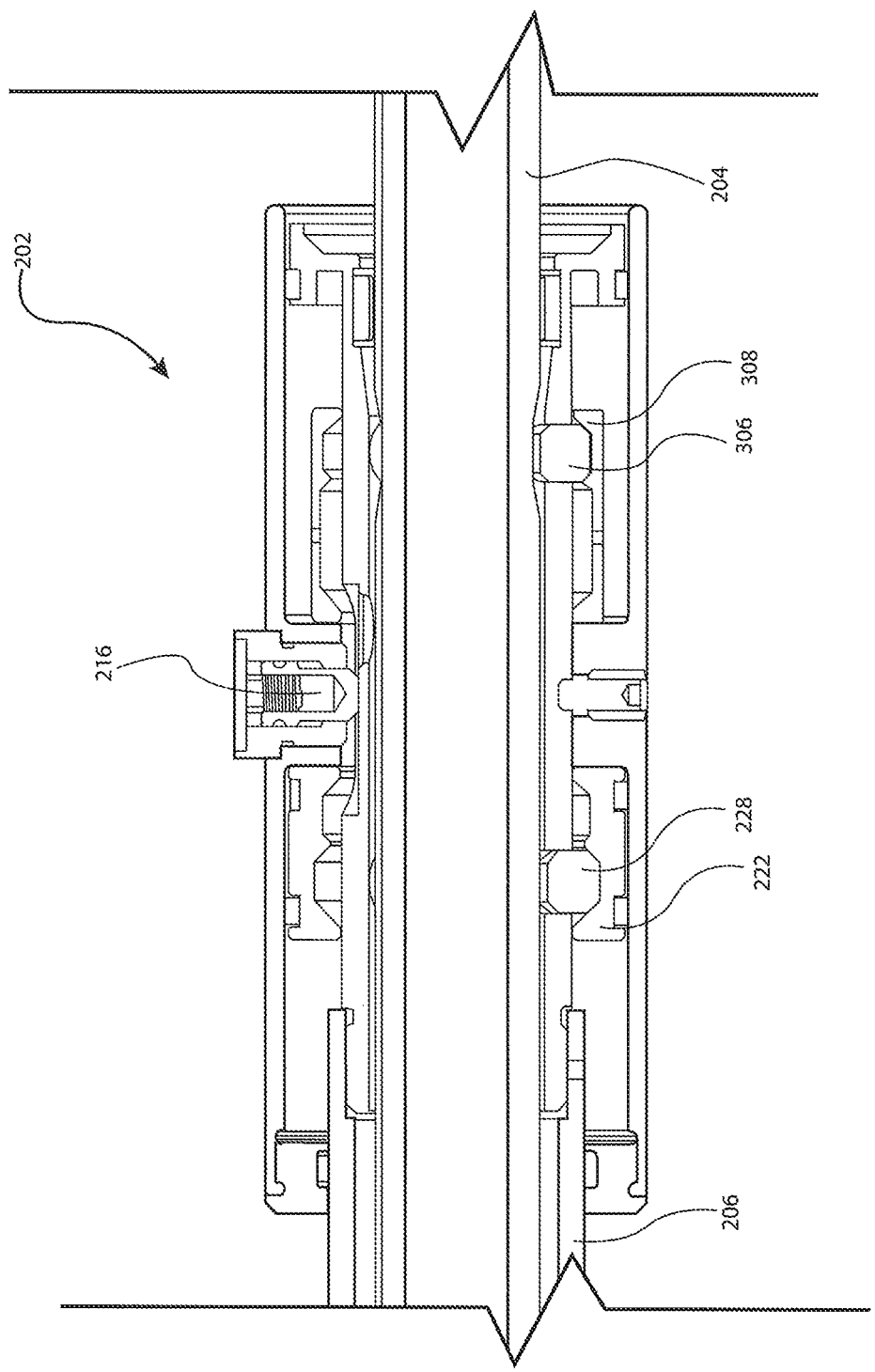
FIG. 21 illustrates a partial cross-sectional view of a stowed configuration of the hold open rod in accordance with an aspect of the disclosure.

FIG. 21 illustrates a partial cross-sectional view of a stowed configuration of the hold open rod in accordance with an aspect of the disclosure.

In particular, FIG. 21 illustrates the stowed configuration of the hold open rod 202 and further illustrates for this configuration a position of the outer tube 206, a position of the inner tube 204, a position of the locking dog 228, a position of the locking collar 222, a position of the damping dog 306, and a position of the damping collar 308. This configuration relates to position 3 illustrated in FIG. 24 below. In this configuration, the damping dog 306 is engaged and the locking dog 228 is disengaged.

Figure 22:
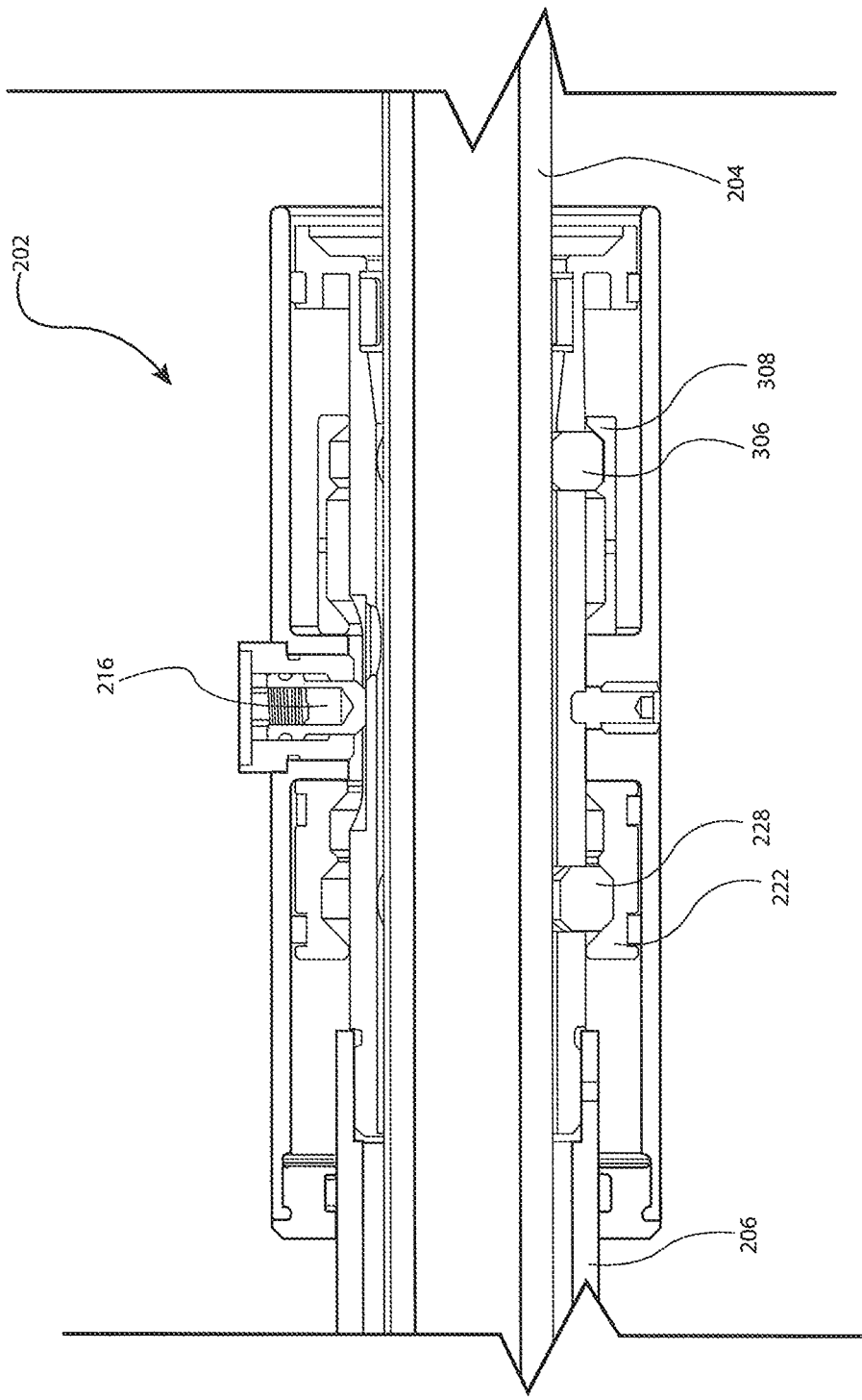
FIG. 22 illustrates a partial cross-sectional view of a stow length to extended and locked configuration of the hold open rod in accordance with an aspect of the disclosure.

FIG. 22 illustrates a partial cross-sectional view of a stow length to extended and locked configuration of the hold open rod in accordance with an aspect of the disclosure.

In particular, FIG. 22 illustrates the stow length to extended and locked configuration of the hold open rod 202 and further illustrates for this configuration a position of the outer tube 206, a position of the inner tube 204, a position of the locking dog 228, a position of the locking collar 222, a position of the damping dog 306, and a position of the damping collar 308. This configuration relates to positions 3 to 2 to 1 illustrated in FIG. 24 below. In this configuration, the damping dog 306 is engaged and the locking dog 228 is disengaged.

Figure 23:
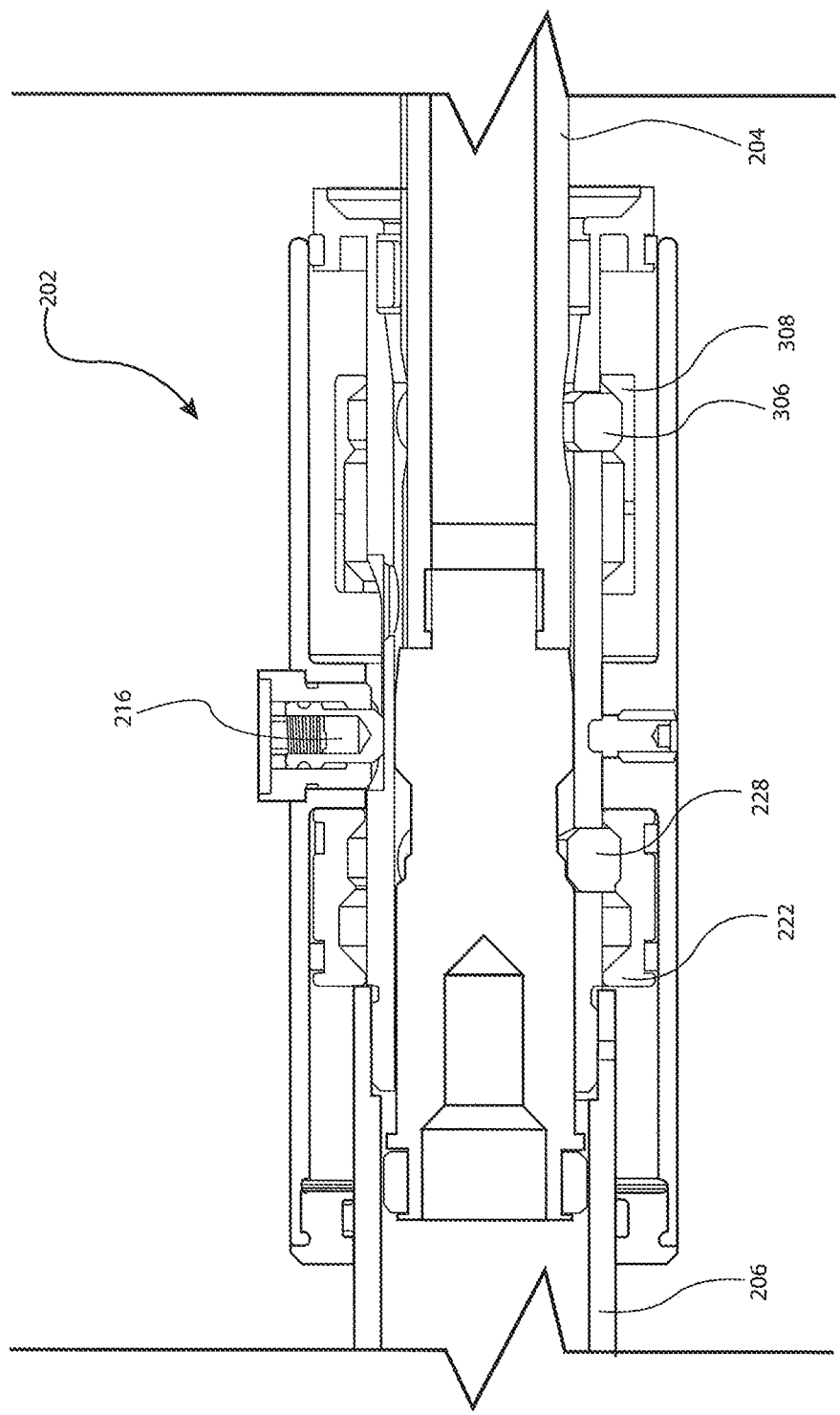
FIG. 23 illustrates a partial cross-sectional view of an extended and locked configuration of the hold open rod in accordance with an aspect of the disclosure.

FIG. 23 illustrates a partial cross-sectional view of an extended and locked configuration of the hold open rod in accordance with an aspect of the disclosure.

In particular, FIG. 23 illustrates the extended and locked configuration of the hold open rod 202 and further illustrates for this configuration a position of the outer tube 206, a position of the inner tube 204, a position of the locking dog 228, a position of the locking collar 222, a position of the damping dog 306, and a position of the damping collar 308. This configuration relates to position 1 illustrated in FIG. 24 below. In this configuration, the damping dog 306 is engaged in the relief portion of the outer surface 304 and the locking dog 228 is engaged.

FIG. 24 illustrates an exemplary application of the hold open rod along with the kinematics of the hold open rod in relation to the kinematics of a particular application in accordance with an aspect of the disclosure.

In particular, FIG. 24 illustrates an exemplary application of the hold open rod 202 and a component that is a fan cowl door (door 100). In this regard, FIG. 24 illustrates various exemplary positions of the hold open rod 202 and corresponding exemplary positions of the door 100.

In this regard, position 1 relates to the door 100 being in position 100-1 and the hold open rod 202 being in position 202-1 (door 100 open); position 2 relates to the door 100 being in position 100-2 and the hold open rod 202 being in position 202-2 (door 100 opening/closing); and position 3 relates to the door 100 being in position 100-3 and the hold open rod 202 being in position 202-3 (door 100 closed).

In one aspect, when the door 100 and the hold open rod 202 are positioned in position 1, the hold open rod 202 may be extended and locked holding a tension load.

In one aspect, when the door 100 and the hold open rod 202 are translating from position 1 to position 2, the hold open rod 202 is unlocked, and the damping mechanism 300 may be disengaged as the hold open rod 202 approaches a minimum length.

In one aspect, when the door 100 and the hold open rod 202 are positioned in position 2, the hold open rod 202 is unlocked and the damping mechanism 300 may be disengaged at a minimum length of the hold open rod 202.

In one aspect, when the door 100 and the hold open rod 202 are translating from position 2 to position 3, the hold open rod 202 may be unlocked and the damping mechanism 300 may be disengaged from the minimum length to the stow length.

In one aspect, when the door 100 and the hold open rod 202 are positioned in position 3, the hold open rod 202 is unlocked and the damping mechanism 300 may disengaged.

In one aspect, when the door 100 and the hold open rod 202 are translating from position 1 to position 2 to position 3, the hold open rod 202 may be unlocked and the damping mechanism may be configured to be engaged and damping all the way to the extended and locked position (at position 1).

In one aspect, when the door 100 and the hold open rod 202 are back to being positioned in position 1, the hold open rod 202 may be extended and locked holding a tension load.

Although the disclosure has set forth a locking functionality with the hold open rod 202, it is also contemplated that the hold open rod 202 may be implemented with fewer components then illustrated and described. In particular, the hold open rod 202 may be configured as a non-locking telescopic damping device.

Although the disclosure has set forth a single stage hold open rod 202 implementation, the disclosure further contemplates a multi-stage configuration of the hold open rod 202. In this regard, the hold open rod 202 may include inner, intermediate, and outer tube assemblies. In other aspects, the hold open rod 202 may include inner, multiple intermediate, and outer tube assemblies.

Although the disclosure has set forth a hold open rod 202 having the damping mechanism 300 contacting the inner tube 204, it is contemplated that the damping mechanism 300 may be implemented to act against an inner diameter (ID) of the outer tube 206.

In further aspects of the disclosure, the hold open rod 202 may be implemented and integrated with seals on the inner tube 204, the outer tube 206, or the like to prevent intrusion of detritus and contaminating fluids.

Accordingly, the disclosure has set forth a hold open rod with a mechanical damping mechanism that prevents quick unintended movement of the supported component. This damped movement reduces injuries to maintenance personnel and damage to the component, surrounding components, the hold open rod, and the like.

The many features and advantages of the disclosure are apparent from the detailed specification, and, thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

What is claimed is:

1. A hold open rod configured to selectively provide damping during particular operational movements, the hold open rod comprising:
   an inner tube coupled to an outer tube, the inner tube movable within the outer tube;
   a tube stop comprising an inner lock groove arranged on an outside surface the tube stop and the tube stop is configured to prevent the inner tube from separating from the outer tube;
   a damping mechanism configured to damp movement of the outer tube with respect to the inner tube;
   the damping mechanism comprises a damping dog and a damping collar;
   the damping collar comprises a damping groove that receives the damping dog when the damping mechanism is in a damping configuration;
   the damping collar comprises a non-damping groove that receives the damping dog when the damping mechanism is in a non-damping configuration;
   the damping collar is configured to move the damping dog from the damping configuration to the non-damping configuration;
   a locking mechanism comprising a locking collar and a locking dog;
   the locking collar comprising a lock groove and an unlock groove;
   the locking mechanism is configured to locate the locking dog to engage the unlock groove when the hold open rod is in an unlocked configuration; and
   the locking mechanism is configured to locate the locking dog to engage the lock groove and contact the inner lock groove on the outside surface the tube stop when the hold open rod is in a locked configuration,
   wherein the damping mechanism is configured such that in the damping configuration the damping dog is located to apply a pressure to the inner tube and mechanically damp a movement of the inner tube that comprises slowing movement of the inner tube with respect to the outer tube.

2. The hold open rod of claim 1 further comprising:
   an outer collar coupled at least around the locking collar;
   the damping collar being arranged inside the outer collar and the locking collar being arranged inside the outer collar; and
   an inner collar spring located within the outer collar configured to engage the locking collar.

3. The hold open rod of claim 2, further comprising a no-unlock feature arranged between the unlock groove and the lock groove,
   wherein the no-unlock feature is configured to prevent the locking dog from inadvertently sliding between the unlock groove and lock groove.

4. The hold open rod of claim 2, wherein:
   the hold open rod being configured to be attached to a door;
   the hold open rod being configured such that when the hold open rod is extended, the locking dog is arranged in the lock groove, and the hold open rod is locked holding a compressive load of the door; and
   the hold open rod being further configured such that when the door is opening/closing, the hold open rod is unlocked with the locking dog arranged in the unlock groove, and the damping mechanism positions the damping dog in the damping groove as the hold open rod approaches a minimum length.

5. The hold open rod of claim 2, further comprising:
   a lock body coupled to the outer tube; and an unlocked indicator arranged on the lock body that is configured to be visible when the hold open rod is in the unlocked configuration,
   wherein the unlocked indicator comprises at least one of the following: a visual indicator arranged at a first end of the lock body and a tactile indicator arranged at a first end of the lock body.

6. The hold open rod of claim 5, further comprising a detent pin arranged in the outer collar and the detent pin configured to engage a groove on the lock body when the hold open rod changes from the locked configuration to the unlocked configuration.

7. The hold open rod of claim 6, wherein:
   the outer collar is configured to hold the detent pin and the locking collar is arranged inside the outer collar; and
   the locking dog is configured to contact an inner lock groove when the hold open rod is locked.

8. The hold open rod of claim 1, wherein:
   the locking dog is configured to contact an inner lock groove when the hold open rod is locked; the locking dog being configured to slide between the unlock groove and lock groove; and the locking dog being configured to slide between the unlock groove and lock groove.

9. A hold open rod configured to selectively provide damping during particular operational movements, the hold open rod comprising:
   an inner tube coupled to an outer tube, the inner tube movable with respect to the outer tube;
   a tube stop comprising an inner lock groove arranged on an outside surface the tube stop and the tube stop is configured to prevent the inner tube from separating from the outer tube;
   a damping mechanism configured to mechanically damp a movement of the outer tube with respect to the inner tube;
   the damping mechanism comprises a damping dog and a damping collar;
   the damping collar comprises a damping groove that receives the damping dog when the damping mechanism is in a damping configuration;
   the damping collar comprises a non-damping groove that receives the damping dog when the damping mechanism is in a non-damping configuration;

a locking mechanism comprising a locking collar and a locking dog;

the locking collar comprising a lock groove and an unlock groove;

the locking mechanism is configured to locate the locking dog to engage the unlock groove when the hold open rod is in an unlocked configuration; and the locking mechanism is configured to locate the locking dog to engage the lock groove and contact the inner lock groove on the outside surface the tube stop when the hold open rod is in a locked configuration.

10. The hold open rod of claim 9 further comprising:

an outer collar coupled at least around the locking collar;

the damping collar being arranged inside the outer collar and the locking collar being arranged inside the outer collar; and an inner collar spring located within the outer collar configured to engage the locking collar, wherein the damping mechanism is configured such that the damping groove locates the damping dog to apply a pressure to the inner tube and damp movement of the inner tube that comprises slowing movement of the inner tube with respect to the outer tube.

11. The hold open rod of claim 10, further comprising a no-unlock feature arranged between the unlock groove and the lock groove, wherein the no-unlock feature is configured to prevent the locking dog from inadvertently sliding between the unlock groove and lock groove.

12. The hold open rod of claim 10, wherein:

the hold open rod being configured to be attached to a door; and the locked configuration further comprises the hold open rod locked in an extended length configuration to hold a compressive load of the door.

13. The hold open rod of claim 10, wherein:

the hold open rod being configured to be attached to a door;

the hold open rod being configured such that when the hold open rod is extended, the locking dog is arranged in the lock groove, and the hold open rod is locked holding a compressive load of the door; and the hold open rod being further configured such that when the door is opening/closing, the hold open rod is unlocked with the locking dog arranged in the unlock groove, and the damping mechanism positions the damping dog in the damping groove as the hold open rod approaches a minimum length.

14. The hold open rod of claim 10, further comprising:

a lock body coupled to the outer tube; and an unlocked indicator arranged on the lock body that is configured to be visible when the hold open rod is in the unlocked configuration, wherein the unlocked indicator comprises at least one of the following: a visual indicator arranged at a first end of the lock body and a tactile indicator arranged at a first end of the lock body.

15. The hold open rod of claim 14, further comprising a detent pin arranged in the outer collar and the detent pin configured to engage a groove on the lock body when the hold open rod changes from the locked configuration to the unlocked configuration.

16. The hold open rod of claim 15, wherein:

the outer collar is configured to hold the detent pin and the locking collar is arranged inside the outer collar; and the locking dog is configured to contact an inner lock groove when the hold open rod is locked.

17. The hold open rod of claim 9, wherein:

the locking dog is configured to contact an inner lock groove when the hold open rod is locked.

18. A hold open rod configured to selectively provide damping during particular operational movements, the hold open rod comprising:

an inner tube coupled to an outer tube, the inner tube movable within the outer tube;

a tube stop comprising an inner lock groove arranged on an outside surface the tube stop and the tube stop is configured to prevent the inner tube from separating from the outer tube;

a damping mechanism configured to mechanically damp a movement of the outer tube with respect to the inner tube;

the damping mechanism comprises a damping dog and a damping collar;

the damping collar comprises a damping groove that receives the damping dog when the damping mechanism is in a damping configuration;

the damping collar comprises a non-damping groove that receives the damping dog when the damping mechanism is in a non-damping configuration;

the damping collar is configured to move the damping dog from the damping configuration to the non-damping configuration;

a locking mechanism comprising a locking collar and a locking dog;

the locking collar comprising a lock groove and an unlock groove;

the locking mechanism is configured to locate the locking dog to engage the unlock groove when the hold open rod is in an unlocked configuration; and the locking mechanism is configured to locate the locking dog to engage the lock groove and contact the inner lock groove on the outside surface the tube stop when the hold open rod is in a locked configuration, wherein the damping mechanism is configured such that in the damping configuration the damping dog is located to apply a pressure to the inner tube and damp movement of the inner tube that comprises slowing movement of the inner tube with respect to the outer tube;

the hold open rod being configured to be attached to a door;

wherein the hold open rod being configured such that when the hold open rod is extended, the locking dog is arranged in the lock groove, and the hold open rod is locked holding a compressive load of the door; and wherein the hold open rod being further configured such that when the door is opening/closing, the hold open rod is unlocked with the locking dog arranged in the unlock groove, and the damping mechanism is engaged with the damping dog arranged in the damping groove as the hold open rod approaches a minimum length.

19. The hold open rod of claim 18 wherein:

the locking mechanism is configured such that the lock groove locates the locking dog in a locked configuration to prevent the inner tube from sliding with respect to the outer tube.

* * * * *